US009020727B2

(12) United States Patent
Inoue et al.

(10) Patent No.: US 9,020,727 B2
(45) Date of Patent: Apr. 28, 2015

(54) VEHICLE BRAKING ASSIST DEVICE AND VEHICLE BRAKING ASSIST METHOD

(75) Inventors: Takuya Inoue, Sagamihara (JP); Takeshi Sugano, Kawasaki (JP); Masahiro Kobayashi, Isehara (JP); Kazunori Kurata, Atsugi (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 157 days.

(21) Appl. No.: 13/188,551

(22) Filed: Jul. 22, 2011

(65) Prior Publication Data

US 2012/0022759 A1 Jan. 26, 2012

(30) Foreign Application Priority Data

Jul. 23, 2010 (JP) .................................. 2010-165959

(51) Int. Cl.
| | |
|---|---|
| G06F 7/70 | (2006.01) |
| G06F 19/00 | (2011.01) |
| G06G 7/00 | (2006.01) |
| G06G 7/76 | (2006.01) |
| B60T 7/22 | (2006.01) |
| B60K 26/02 | (2006.01) |
| B60W 50/10 | (2012.01) |
| B60W 10/18 | (2012.01) |
| B60W 30/09 | (2012.01) |

(52) U.S. Cl.
CPC ................. B60T 7/22 (2013.01); B60K 26/021 (2013.01); B60T 2201/022 (2013.01); B60W 10/18 (2013.01); B60W 30/09 (2013.01); B60W 50/10 (2013.01); B60W 2540/10 (2013.01); B60W 2550/302 (2013.01); B60W 2550/308 (2013.01); B60W 2710/18 (2013.01)

(58) Field of Classification Search
CPC ............. B60T 7/12; B60T 8/17; B60T 7/042; B60T 13/662; B60W 10/84
USPC .......................................................... 701/70
See application file for complete search history.

(56) References Cited

U.S. PATENT DOCUMENTS 6,405,132 B1 * 6/2002 Breed et al. .................... 701/301
7,042,345 B2 * 5/2006 Ellis .............................. 340/436

(Continued)

FOREIGN PATENT DOCUMENTS

| CN | 1386102 A | 12/2002 |
|---|---|---|
| CN | 1721244 A | 1/2006 |
| JP | 2003-267201 | 9/2003 |
| JP | 2004-161100 | 6/2004 |

(Continued)

*Primary Examiner* — Behrang Badii
*Assistant Examiner* — Daniel L Greene
(74) *Attorney, Agent, or Firm* — Drinker Biddle & Reath LLP

(57) ABSTRACT

A vehicle braking assist device for a host vehicle includes a risk potential computing part that computes a risk potential of the host vehicle with respect to an obstacle in the travelling direction of the host vehicle, an accelerator operation state sensor that detects the operation state of an accelerator, and a braking force application device that applies a first braking force on the host vehicle when the risk potential is higher than a predetermined first threshold and the detected operation state of the accelerator indicates that the accelerator is not being operated, and that applies a second braking force on the host vehicle irrespective of the operation state of the accelerator when the risk potential is higher than a predetermined second threshold, the risk potential represented by the second threshold being higher than the risk potential represented by the first threshold.

17 Claims, 12 Drawing Sheets

(56) References Cited

U.S. PATENT DOCUMENTS

| | | | |
|---|---|---|---|
| 8,095,313 B1* | 1/2012 | Blackburn | 701/301 |
| 2003/0176960 A1 | 9/2003 | Yamamura | |
| 2005/0134440 A1* | 6/2005 | Breed | 340/435 |
| 2005/0279554 A1* | 12/2005 | Kobayashi et al. | 180/197 |
| 2007/0213916 A1* | 9/2007 | Sugano et al. | 701/96 |
| 2008/0015778 A1 | 1/2008 | Matsuura et al. | |
| 2008/0074246 A1 | 3/2008 | Isaji et al. | |
| 2008/0243335 A1* | 10/2008 | Rao et al. | 701/38 |
| 2010/0106356 A1* | 4/2010 | Trepagnier et al. | 701/25 |

FOREIGN PATENT DOCUMENTS

| | | |
|---|---|---|
| JP | 2004-210148 A | 7/2004 |
| JP | 2005-125935 | 5/2005 |
| JP | 2006-27463 | 2/2006 |
| JP | 2008-18832 | 1/2008 |
| JP | 2008-018832 A | 1/2008 |
| JP | 2008-49932 | 3/2008 |
| JP | 2008-018832 | 4/2008 |
| JP | 2008-77412 | 4/2008 |
| JP | 2008-077412 | 4/2008 |
| JP | 2008-077412 A | 4/2008 |

* cited by examiner

VEHICLE BRAKING ASSIST DEVICE AND VEHICLE BRAKING ASSIST METHOD

CROSS-REFERENCE TO RELATED APPLICATIONS

This application claims priority under 35 U.S.C. §119 to Japanese Patent Application No. 2010-165959, filed on Jul. 23, 2010, which is incorporated by reference herein in its entirety.

BACKGROUND OF THE INVENTION

1. Field of Invention

This invention pertains to a technology of vehicle braking assist for assisting driver operation with respect to obstacles in the travelling direction of the host vehicle.

2. Description of Related Art

Vehicle braking assist devices exist for assisting driver operation with respect to obstacles in the travelling direction of the host vehicle. In one such type of vehicle braking assist device, a determination is made whether the brake-to-avoid limit has been overrun based on the distance and relative speed with respect to the obstacle ahead of the host vehicle obtained by means of radar. When it is judged that the brake-to-avoid limit has been overrun, a braking force is applied to assist the driver operation. But this system does not take into account other actions that may be taken by the driver to avoid the obstacle.

SUMMARY OF THE INVENTION

In a vehicle operation assist device that assists driver operation of the braking function, it is necessary to set the assist to ensure early start of application of the braking force (braking assist) in order to enable avoiding the obstacle in the lane where the host vehicle is travelling, particularly when the vehicle is travelling at a high speed. However, if the braking assist is applied too early, some problems may result. For example, it would be problematic if the braking assist is applied while the driver accelerates intentionally to approach the obstacle to pass it, or if the braking assist is applied against the intention of the driver, which can cause the driver discomfort with the operation of the vehicle.

In order to solve the problem, an object of the present invention is to provide device and method in which the braking assist to the driver operation with respect to obstacles in the travelling direction of the host vehicle is executed appropriately corresponding to the intention of the driver.

Consequently, a vehicle braking assist device as described herein operates as follows. When it is determined that the risk potential of the host vehicle with respect to an obstacle in the travelling direction of the host vehicle is higher than a preset first threshold while the accelerator is not operated for acceleration, a braking force is applied on the host vehicle. In addition, when it is determined that the risk potential of the host vehicle with respect to the obstacle in the travelling direction of the host vehicle is higher than a second threshold, which is higher than the first threshold, a braking force is applied to the host vehicle irrespective of the operation state of the accelerator.

An embodiment of a vehicle braking assist device is disclosed for a host vehicle, the vehicle braking assist device including a risk potential computing part that computes a risk potential of the host vehicle with respect to an obstacle in the travelling direction of the host vehicle, an accelerator operation state sensor that detects the operation state of an accelerator, and a braking force application device that applies a first braking force on the host vehicle when the risk potential is higher than a predetermined first threshold and the detected operation state of the accelerator indicates that the accelerator is not being operated, and that applies a second braking force on the host vehicle irrespective of the operation state of the accelerator when the risk potential is higher than a predetermined second threshold, wherein the risk potential represented by the second threshold is higher than the risk potential represented by the first threshold.

An embodiment of a method of assisting vehicle braking of a host vehicle is disclosed, including detecting a risk potential of the host vehicle with respect to an obstacle in a travelling direction of the host vehicle, detecting an operating state of accelerator of the host vehicle, applying a first braking force on the host vehicle when the risk potential of the host vehicle with respect to the obstacle in the travelling direction of the host vehicle is higher than a first threshold and the operating state of the accelerator indicates the accelerator is not being operated, and applying a second braking force on the host vehicle when the risk potential of the host vehicle with respect to the obstacle in the travelling direction of the host vehicle is higher than a second threshold that is higher than the first threshold, irrespective of the operation state of the accelerator.

An embodiment of a vehicle braking assist device for a host vehicle is disclosed, including a risk potential computing means for computing a risk potential of the host vehicle with respect to an obstacle in the travelling direction of the host vehicle, an accelerator detecting means for detecting the operation state of an accelerator, a first braking force application means for applying a first braking force on the host vehicle when the risk potential is higher than a predetermined first threshold and the detected operation state indicates that the accelerator is not being operated, and a second braking force application means for applying a second braking force on the host vehicle irrespective of the operation state of the accelerator when the risk potential is higher than a predetermined second threshold, wherein the risk potential represented by the second threshold is higher than the risk potential represented by the first threshold.

According to the present invention, a braking force is applied on the host vehicle irrespective of the operation state of the accelerator if the risk potential is higher than the second threshold with respect to an obstacle in the travelling direction of the host vehicle. Consequently, braking can be applied reliably in assisting the driver operation. Further, when the risk potential is between a first threshold and the second threshold, with the first threshold having a risk potential lower than that of the second threshold, if the accelerator is not operated for acceleration, a braking force is applied to the host vehicle, so that a braking force is applied only when the driver does not intend to accelerate. As a result, it is possible to apply a braking force to the host vehicle corresponding to the intention of the driver. Consequently, it is possible to assist the driver with respect to obstacles in the travelling direction of the host vehicle appropriately corresponding to the intention of the driver.

BRIEF DESCRIPTION OF THE DRAWINGS

The accompanying drawings, which are incorporated herein and constitute part of this specification, illustrate the presently preferred embodiments of the invention, and together with the general description given above and the detailed description given below, serve to explain features of the invention.

DETAILED DESCRIPTION OF THE PREFERRED EMBODIMENTS

Figure 1:
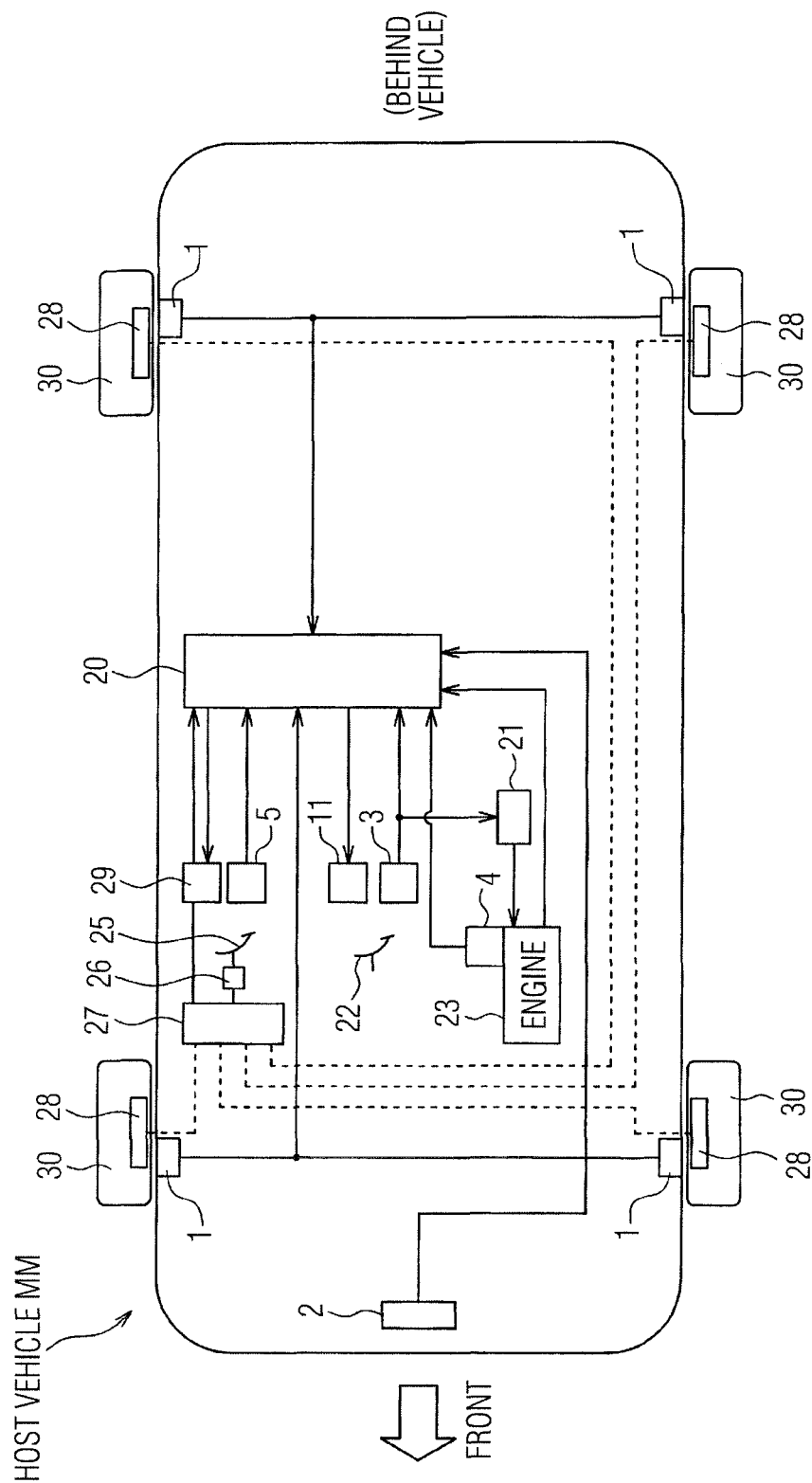
FIG. 1 is a schematic view of a host vehicle according to an embodiment of the present invention.

A first embodiment of a vehicle braking assist device will be explained with reference to the figures. FIG. 1 is a schematic view of a host vehicle MM according to an embodiment of the present invention. The host vehicle MM includes one or more wheel velocity sensors 1, an obstacle information detecting sensor 2, an accelerator operation state sensor 3, a throttle operation state sensor 4, a shift position sensor 5, an accelerator reactive force application device 11, a throttle operation state controlling part 21, a controller 20, and an engine 23 as the driving source of the vehicle that applies driving force to wheels via a transmission (not shown).

The wheel velocity sensors 1 are arranged corresponding to each wheel 30 of the host vehicle MM, and the wheel velocity of each wheel 30 is detected and output to the controller 20. The obstacle information detecting sensor 2 detects an obstacle XM located ahead of the host vehicle MM in the travelling direction of the host vehicle MM, and outputs the information of detected obstacle XM to controller 20. For example, the obstacle information detecting sensor 2 may be laser radar that emits a laser beam ahead of the host vehicle MM and receives reflected light, and that detects the time from exit of the laser beam to reception of the reflected light and outputs it to controller 20. In this embodiment, the obstacle information detecting sensor 2 is described as laser radar. However, other types of devices can be appropriately selected, such as mm-wave radar, a camera, or the like that can detect information regarding an obstacle XM ahead of the vehicle.

The accelerator operation state sensor 3 detects the accelerator operation state (manipulation quantity) of an accelerator 22 and outputs the detected accelerator operation state to the controller 20. The throttle operation state sensor 4 detects the throttle operation state of the engine 23, and outputs the detected throttle operation state to the controller 20. The transmission position sensor 5 detects the transmission position of the transmission (e.g., the shift stage of the transmission or the transmission ratio), and outputs the detected transmission position to the controller 20.

The accelerator reactive force application device 11 is an actuator equipped with a motor or the like for applying a reactive force on the accelerator 22 based on an instruction from the controller 20. Just like a conventional accelerator which has a spring or other reactive force applying structure, a normal reactive force corresponding to the manipulation quantity of accelerator 22 is applied to the accelerator 22 during normal operation. Consequently, the reactive force applied by the accelerator reactive force application device 11 is superposed on the normal reactive force as it is applied. Thus, when the accelerator reactive force application device 11 is off, the net reactive force generated at accelerator 22 is normal reactive force However, when the accelerator reactive force application device 11 is turned on, the reactive force applied by accelerator reactive force application device 11 is added to the normal reactive force to get the net reactive force actually applied to the accelerator 22.

The throttle operation state controlling part 21 computes a throttle operation state target value based on the accelerator operation state detected by the accelerator operation state sensor 3, and controls the throttle operation state of the engine 23 based on the computed throttle operation state target value. In one example, a map that defines the correlation between the accelerator operation state and the throttle operation state target value can be stored beforehand, and the map can be used to compute the throttle operation state target value from the accelerator operation state detected by the accelerator operation state sensor 3. In another example, a numeric equation representing the correlation between the accelerator operation state and the throttle operation state target value can be stored beforehand, and, based on the pre-stored numeric equation, the throttle operation state target value can be computed from the accelerator operation state detected by accelerator operation state sensor 3. In other words, various methods may be used for computing the throttle operation state target value.

The host vehicle MM also includes a brake 25 operated by the driver. The brake 25 is connected with master cylinder 26 via a booster (not shown). The master cylinder 26 is connected with a wheel cylinder 28 at each wheel 30 via a hydraulic circuit 27. When the vehicle braking assist device is off (inactive), the braking hydraulic pressure is increased corresponding to the operation quantity of the brake 25 by the driver by means of the master cylinder 26. The increased braking hydraulic pressure is fed via the hydraulic circuit 27 to the wheel cylinder 28 of each wheel 30.

A braking hydraulic pressure controlling part 29 controls the actuator in the hydraulic circuit 27 based on a braking force instruction value from the controller 20, and the braking hydraulic pressure on each wheel 30 is controlled individually. The braking hydraulic pressure controlling part 29 and the hydraulic circuit 27 may, for example, be included in a braking hydraulic pressure controlling part typically used in an anti-skid or anti-lock brake system controller (ABS), a traction controller (TCS), or a vehicle dynamics controller (VDC). The braking hydraulic pressure controlling part 29 and the hydraulic circuit 27 form a braking force application device 9 to be explained later. The braking force application device 9 is not limited to using hydraulic pressure, but may alternatively be made of an electric braking unit or the like.

Figure 2:
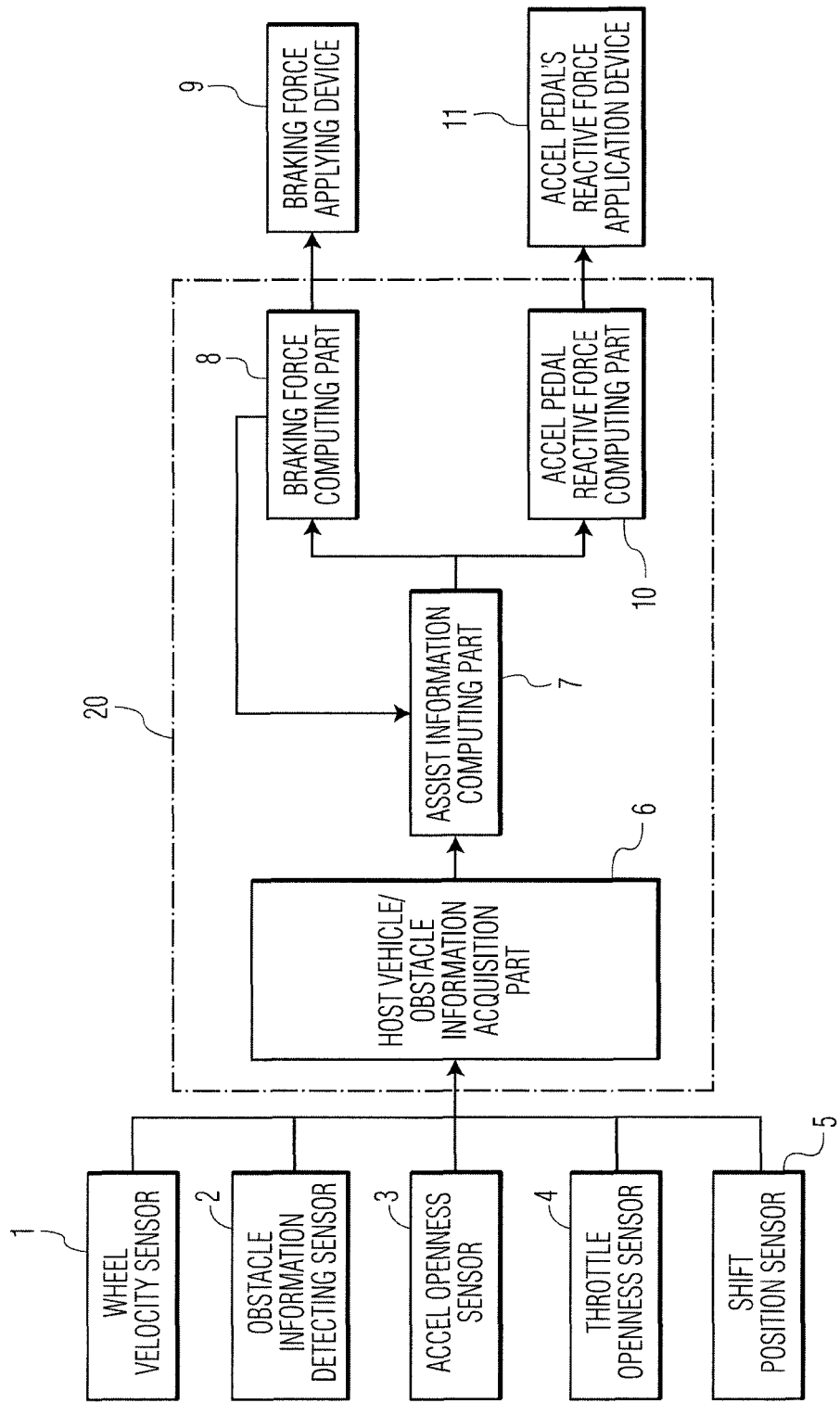
FIG. 2 is a schematic view of the controller of the host vehicle in FIG. 1 according to an embodiment of the present invention.

FIG. 2 is a schematic view of the controller 20 of the host vehicle MM in FIG. 1 according to an embodiment of the present invention. The constitution of the host vehicle MM other than the internal constitution of the controller 20 is the same as in FIG. 1 explained above, so the same symbols as those adopted above in FIG. 1 are used here, and an explanation will not be repeated here. The controller 20 has host a vehicle/obstacle information acquisition part 6, an assist information computing part 7, a braking force computing part 8, and an accelerator reactive force computing part 10. Below, the contents of the host vehicle/obstacle information acquisition part 6, the assist information computing part 7, the braking force computing part 8, and the accelerator reactive force computing part 10 are explained with reference to FIGS. 3-6.

Figure 3:
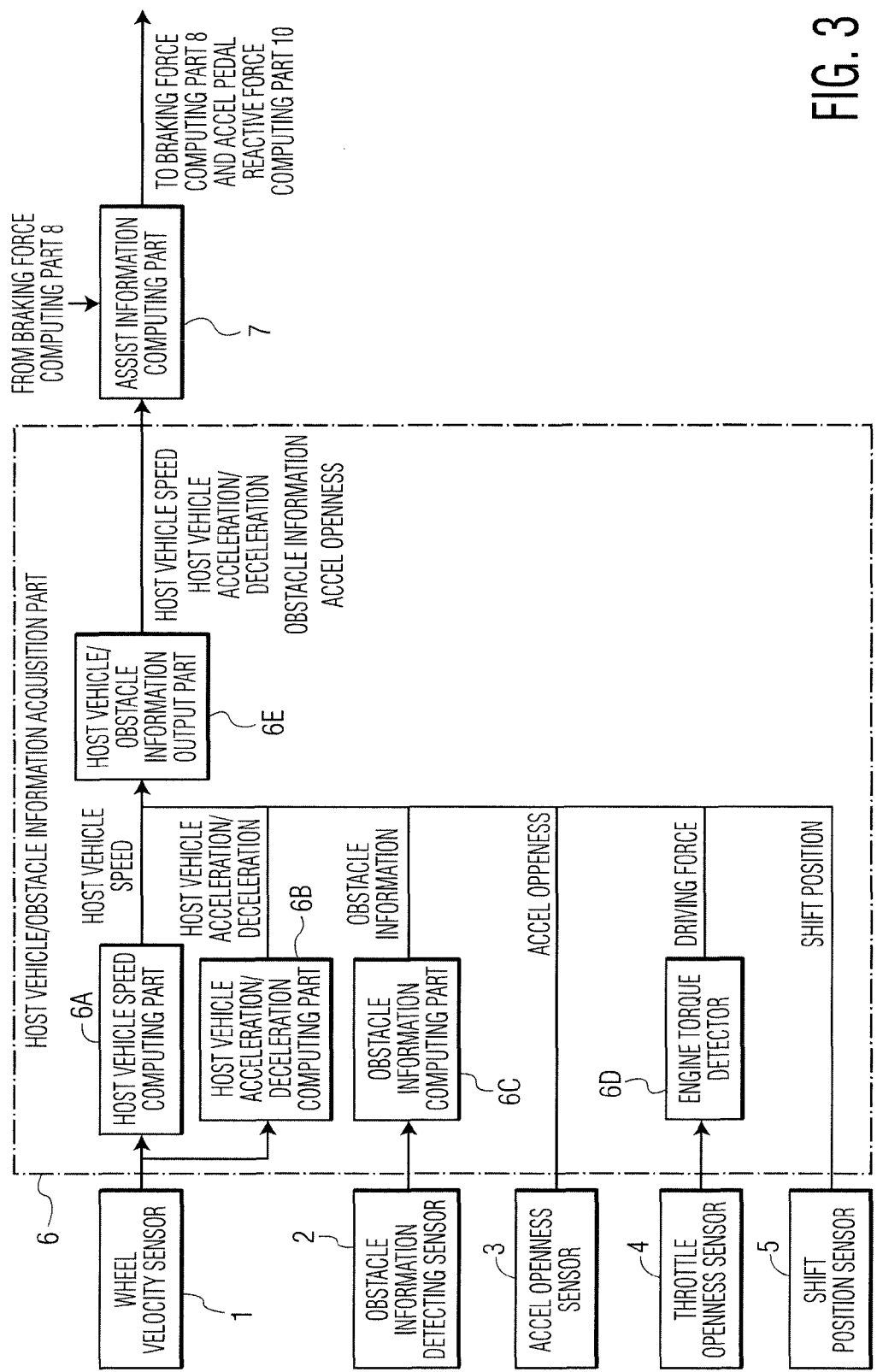
FIG. 3 is a schematic view of a host vehicle/obstacle information acquisition part of the host vehicle in FIG. 1 according to an embodiment of the present invention.

FIG. 3 is a schematic view of the host vehicle/obstacle information acquisition part 6 of the host vehicle MM in FIG. 1 according to an embodiment of the present invention. As shown in FIG. 3, the host vehicle/obstacle information acquisition part 6 has a host vehicle speed computing part 6A, a host vehicle acceleration/deceleration computing part 6B, an obstacle information computing part 6C, an engine torque detector 6D, and a host vehicle/obstacle information output part 6E.

Based on the various wheel velocities input from the wheel velocity sensors 1, the host vehicle speed computing part 6A computes the host vehicle speed, and outputs the computed result to the host vehicle/obstacle information output part 6E. Methods for computing the host vehicle speed from the wheel velocities of the various wheels is well known. For example, the host vehicle speed may be computed based on the mean value of the various wheel velocities, or the lowest value among them, and the tire diameter.

Based on the various wheel velocities input from the wheel velocity sensors 1, the host vehicle acceleration/deceleration computing part 6B computes acceleration/deceleration A of the host vehicle MM, and outputs the computed result to the host vehicle/obstacle information output part 6E. The host vehicle acceleration/deceleration computing part 6B computes the host vehicle speed in the same manner as the host vehicle speed computing part 6A and then differentiates the computed host vehicle speed to compute acceleration/deceleration A of the host vehicle. Alternatively, the host vehicle acceleration/deceleration computing part 6B may differentiate the host vehicle speed computed by the host vehicle speed computing part 6A in order to compute acceleration/deceleration A of the host vehicle MM.

Based on the time interval from the exit of the laser beam to the reception of the reflected light input from the obstacle information detecting sensor 2, the obstacle information computing part 6C determines the obstacle information including the distance (relative distance) between the obstacle ahead of the host vehicle MM and the host vehicle MM, as well as the relative speed between the host vehicle MM and the obstacle XM, and outputs the computed results to the host vehicle/obstacle information output part 6E.

Based on the throttle operation state input from the throttle operation state sensor 4, the engine torque detector 6D computes the output torque of engine 23, and outputs the computed result to the host vehicle/obstacle information output part 6E. In one example, the output torque of the engine 23 may be determined using a map defining the correlation between the throttle operation state and the output torque that is stored beforehand, and, by means of the map, the determining the output torque from the throttle operation state received from throttle operation state sensor 4. In another example, the output torque of the engine 23 may be determined using a numeric equation defining the correlation between the throttle operation state and the output torque that is stored beforehand, and, based on the numeric equation, determining the output torque of the engine 23 from the throttle operation state received from throttle operation state sensor 4. Other methods may be used, and the method for computing the output torque of engine 23 may be varied as appropriate.

The host vehicle speed, the acceleration/deceleration A, the obstacle information, the accelerator operation state, the engine torque, and the transmission position respectively output from the host vehicle speed computing part 6A, the host vehicle acceleration/deceleration computing part 6B, the obstacle information computing part 6C, the accelerator operation state sensor 3, the engine torque detector 6D, and the transmission position sensor 5 are input to the host vehicle/obstacle information output part 6E, which then outputs the input information of host vehicle MM and obstacle XM as the host vehicle/obstacle information to the assist information computing part 7.

Figure 4:
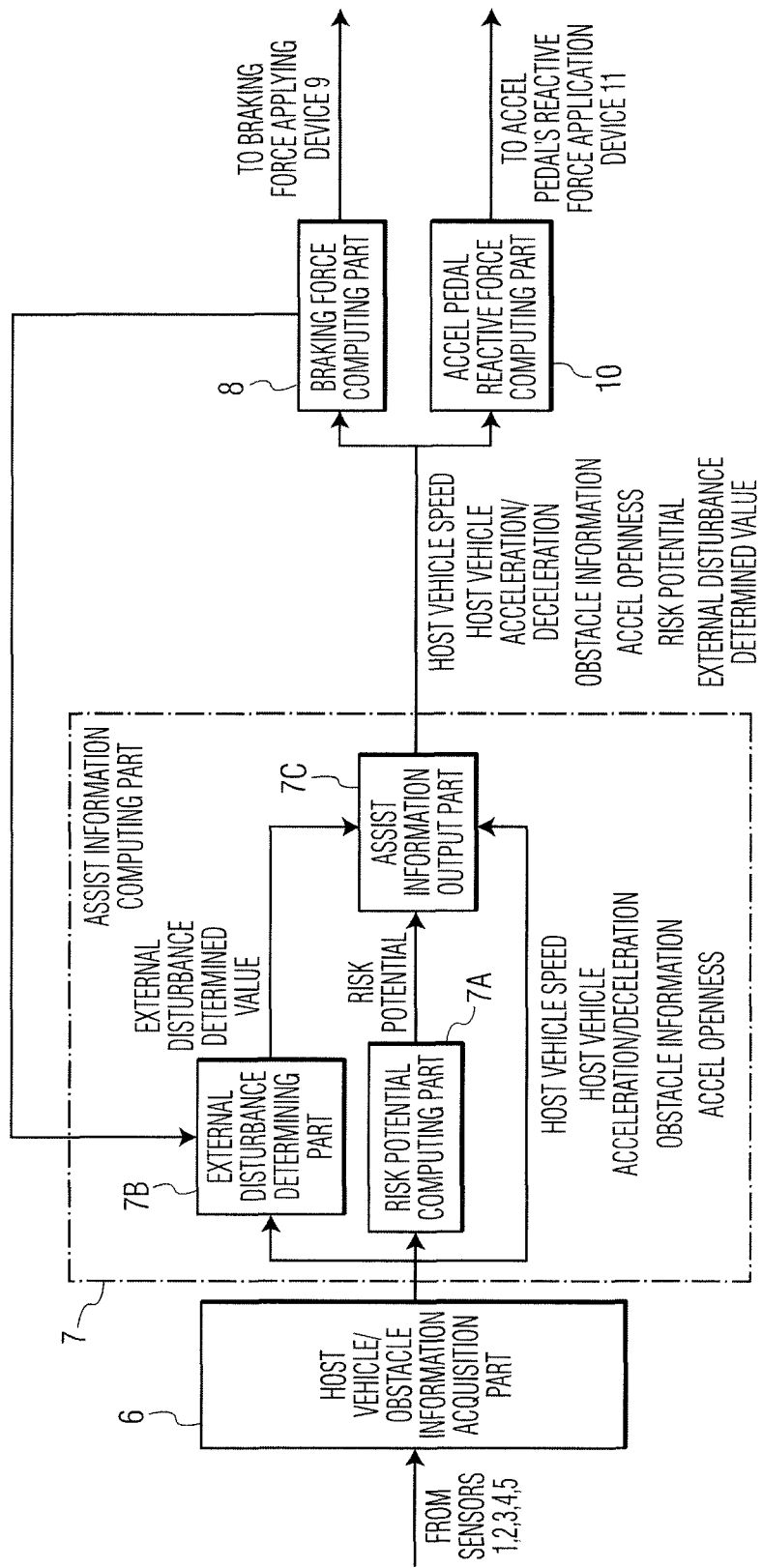
FIG. 4 is a schematic view of an assist information computing part of the host vehicle in FIG. 1 according to an embodiment of the present invention.

FIG. 4 is a schematic view of the assist information computing part 7 of the host vehicle MM in FIG. 1 according to an embodiment of the present invention. As shown in FIG. 4, the assist information computing part 7 has a risk potential computing part 7A, an external disturbance determining part 7B, and an assist information output part 7C.

Based on the host vehicle/obstacle information input from host vehicle/obstacle information output part 6E of host vehicle/obstacle information acquisition part 6, the risk potential computing part 7A computes the proximity of the host vehicle MM to the obstacle XM ahead of host vehicle MM. This proximity is a value indicating the risk potential. More specifically, an arrival time TTC is computed for the host vehicle MM to reach the position of obstacle XM as the proximity with respect to the obstacle XM ahead of the host vehicle MM, and the computed arrival time TTC is output to the assist information output part 7C.

In this embodiment, the arrival time TTC required for the host vehicle MM to reach the position of the obstacle XM is computed as a value representing the risk potential. The arrival time TTC is a value indicating the proximity, that is, the time for host vehicle MM to reach obstacle XM ahead of the host vehicle MM. Consequently, the shorter the arrival time TTC, the higher the proximity of the host vehicle MM to the obstacle XM, and the higher the risk potential (i.e., the risk that the host vehicle MM will contact obstacle XM). In the following explanation, the arrival time TTC is used as the value representing the risk potential. Here, arrival time TTC is represented by following equation (1).

$$TTC = D\_tar / V\_tar \quad (1)$$

where

D_tar=the relative distance to the obstacle XM

V_tar=the relative speed with respect to the obstacle XM

The arrival time TTC is a value representing the risk potential, so that the smaller the value of the arrival time TTC, the higher the risk potential, and the larger the value of the arrival time TTC, the lower the risk potential. Alternatively, the reciprocal of arrival time TTC may be used as the risk potential.

The risk potential computing part 7A acquires from the host vehicle/obstacle information acquisition part 6 the relative distance D_tar (m) to obstacle XM and the relative speed V_tar (m/s) with respect to obstacle XM, and uses equation (1) to compute the arrival time TTC as a value representing the risk potential. The relative speed V_tar with respect to the obstacle XM may be determined by differentiating with respect to time the relative distance D_tar to the obstacle XM detected by the obstacle information detecting sensor 2. Alternatively, when the obstacle information detecting sensor 2 is constituted by mm-wave radar, the relative speed may be computed based on the variation in frequency in the reflected wave with respect to the emitted mm-wave (i.e., the Doppler shift). Other methods for computing the relative speed may also be used.

Based on at least one of the host vehicle/obstacle information input from the host vehicle/obstacle information acquisition part 6, the driving force and the transmission position received from the host vehicle/obstacle information acquisition part 6, and the processing result of computing of the braking force input from the braking force computing part 8, the external disturbance determining part 7B determines external disturbance determined value SUB, and then outputs the computed external disturbance determined value SUB to the assist information output part 7C. In one example, a method for determining an external disturbance based on the host vehicle/obstacle information and the processing result of the braking force computing without using the driving force and the transmission position in a first embodiment of the vehicle braking assist device will be presented. The computation of an external disturbance based on the driving force and the transmission position will be explained later with respect to the fourth embodiment.

The external disturbance determined value SUB in this embodiment is a value determined to represent the degree of external disturbance that suppresses or augments the braking force actually generated in the vehicle when braking is applied on the vehicle under a braking instruction. For the external disturbance determining part 7B in this embodiment, while acceleration/deceleration A (m/s$^2$) of host vehicle MM is input from the host vehicle/obstacle information acquisition part 6, the results of a determination regarding the application of a first braking force and a braking force instruction value P_brk (MPa) in a last round of processing, as explained below, are also input from the braking force computing part 8.

Then, the external disturbance determining part 7B selects the first braking force instruction value P_brk1 as the braking force instruction value P_brk by means of the braking force computing part 8, in a state in which the arrival time TTC is in a region from shorter than TTC1 to longer then TTC2, and no braking force is applied is selected. When a braking force instruction value P_brk over a preset level is output, the braking force computing part 8 carries out the processing for computing external disturbance determined value SUB. More specifically, for example, when the first braking force instruction value P_brk1 is greater than a prescribed value of 0.5 MPa, the external disturbance determination is carried out. Requiring the first braking force instruction value P_brk1 to exceed a prescribed level ensures that a meaningful computation of external disturbance determined value SUB is applied in determining the application of braking. The external disturbance determined value SUB is computed using the following listed equation (2).

$$SUB = |(A/P\_brk) * ARMYU| \quad (2)$$

The braking quantity braking force conversion coefficient ARMYU is a conversion coefficient that is set based on the various parameters of the vehicle for converting deceleration (negative acceleration) to a braking hydraulic pressure. The braking quantity braking force conversion coefficient ARMYU is for pre-determining the coefficient representing the correlation between the deceleration determined from the wheel velocity and the braking hydraulic pressure by performing experiments with a prescribed vehicle weight, road surface frictional coefficient, braking torque transmission rate from the braking device (braking caliper for a frictional brake) to the wheel, etc. set in a standard state (ideal state).

When computing the external disturbance determined value SUB is not carried out, the external disturbance determined value SUB is set at an initial value of "1".

As can be seen from equation (2), in this embodiment, the higher the level of the external disturbance that suppresses or hampers the braking force generated in the vehicle according to the braking force instruction value, the smaller value of external disturbance determined value SUB (i.e., SUB will be less than 1). On the contrary, the higher the level of the external disturbance that augments or increases the actual braking force from the braking force generated in the vehicle according to the braking force instruction value, the larger the value of external disturbance determined value SUB (i.e., SUB will be greater than 1). That is, as compared with the deceleration with respect to the braking hydraulic pressure (braking force) in the standard state when the braking quantity braking force conversion coefficient ARMYU is determined, the higher the level of the external disturbance for decreasing the actual deceleration with respect to the braking hydraulic pressure, the smaller (less than 1) the value of the external disturbance determined value SUB will be. On the contrary, the higher the level of the external disturbance for increasing the deceleration with respect to the braking hydraulic pressure, the larger (greater than 1) the value of the external disturbance determined value SUB will be.

As far as the external disturbance in this embodiment is concerned, as can be seen from the equation (2), the external disturbance determined value SUB indicates the level of influence on the braking driving force generated in the host vehicle MM. The external disturbance refers to an external disturbance including at least one of the braking torque transmission rate, the road surface frictional coefficient, and the vehicle weight when a braking force is applied on the vehicle. When a braking force is applied by the frictional brake via the wheels on the host vehicle MM, the braking torque transmission rate when the braking force is applied on the vehicle corresponds to, e.g., the frictional coefficient of the braking pad.

The assist information output part 7C outputs the information input from the host vehicle/obstacle information acquisition part 6, the risk potential computing part 7A, and the external disturbance determining part 7B to the braking force computing part 8 and the accelerator reactive force computing part 10.

Figure 5:
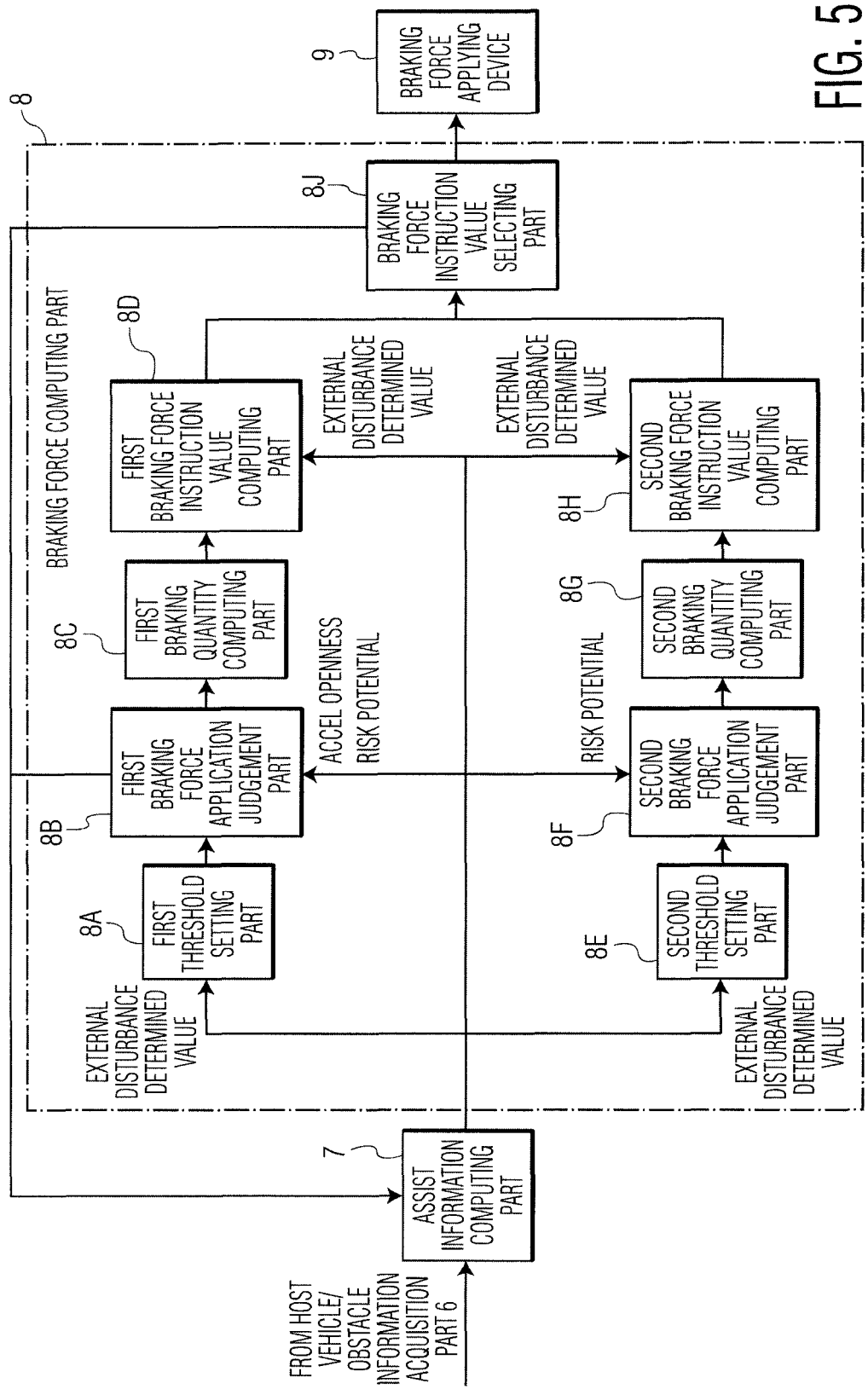
FIG. 5 is a schematic view of a braking force computing part of the host vehicle in FIG. 1 according to an embodiment of the present invention.

FIG. 5 is a schematic view of the braking force computing part of the host vehicle in FIG. 1 according to an embodiment of the present invention. As shown in FIG. 5, the braking force computing part 8 has a first threshold setting part 8A, a first braking force application judgment part 8B, a first braking quantity computing part 8C, a first braking force instruction value computing part 8D, a second threshold setting part 8E, a second braking force application judgment part 8F, a second braking quantity computing part 8G, a second braking force instruction value computing part 8H, and a braking force instruction value selecting part 8J.

The first threshold setting part 8A sets the arrival time threshold TTC1 by taking a first threshold Th1 as the risk potential for judging application of a first braking force. Based on the external disturbance determined value SUB input from the assist information computing part 7, the first threshold setting part 8A sets the arrival time threshold TTC1 larger when the external disturbance determined value SUB is smaller (i.e., when the level of the external disturbance hampering braking of host vehicle MM is higher).

More specifically, the first threshold setting part 8A determines the arrival time threshold TTC1 by performing a correction calculation so that it is larger when the external disturbance determined value SUB computed by the external disturbance determining part 7B is smaller (i.e., when the level of the external disturbance for suppressing or hampering the braking force generated in the vehicle is higher) with respect to an arrival time TTC1_0 as a preset prescribed value. Then, arrival time threshold TTC1 determined above is set as the first threshold Th1, that is, the risk potential for judging the application of a first braking force. More specifically, for example, if TTC1_0 is taken as 3, then TTC1 is set in the range of 2.5 to 3.5 by means of a correction calculation. For example, arrival time threshold TTC1 as first threshold Th1 is computed using the following listed equation (3).

$$TTC1 = TTC1\_0 \times (1/SUB) \tag{3}$$

Also, the first braking force application judgment part 8B judges application of the first braking force. The first braking force application judgment part 8B judges that the first braking force is to be applied when the arrival time TTC input from the assist information computing part 7 is shorter than the arrival time threshold TTC1 set by the first threshold setting part 8A, and the accelerator operation state input from the assist information computing part 7 is also smaller than a preset prescribed value (prescribed accelerator operation state). In other words, it is judged that the first braking force is to be applied when the risk potential of the host vehicle MM with respect to the obstacle XM is larger than the first threshold Th1 (when the arrival time TTC is shorter than the arrival time threshold TTC1), and when the accelerator operation state is also smaller than a preset prescribed value. If the conditions are not met, it is judged that the first braking force is not to be applied. That is, it is judged that the first braking force is not to be applied even when the risk potential of the host vehicle MM with respect to the obstacle XM is larger than the first threshold Th1 (when the arrival time TTC is shorter than the arrival time threshold TTC1), as long as the accelerator operation state is larger than the preset prescribed value.

The prescribed value (the prescribed accelerator operation state) refers to the smallest accelerator operation state that can be judged to be that the driver operates the accelerator 22 and intends to accelerate, that is, the smallest accelerator operation state that can be judged to be that the driver intentionally manipulates or presses down on the accelerator. Consequently, when the risk potential of the host vehicle MM with respect to the obstacle XM is larger than first threshold Th1 and the accelerator operation state input from the assist information computing part 7 is smaller than a prescribed value (a prescribed accelerator operation state), it is judged that the driver does not intentionally perform accelerator manipulation, and the first braking force is applied. On the other hand, even when the risk potential of the host vehicle MM with respect to the obstacle XM is larger than first threshold Th1, as long as the accelerator operation state input from the assist information computing part 7 is larger than a preset prescribed value (prescribed accelerator operation state), it is judged that the driver intended to manipulate the accelerator 22 while knowing the risk potential of the host vehicle MM with respect to the obstacle XM, and the first braking force is not applied. The prescribed value (prescribed accelerator operation state) may be, for example, an accelerator operation state of 3.4 degrees.

As explained above, the external disturbance determined value SUB is a value determined when the arrival time TTC is shorter than the arrival time threshold TTC1, and the first braking force is applied. Consequently, the arrival time threshold TTC1 is TTC1_0 at the time of the first round of processing when the arrival time TTC becomes shorter than the arrival time threshold TTC1. After that, the arrival time TTC becomes longer than the arrival time threshold TTC1. Then, when the arrival time TTC once again becomes shorter than the arrival time threshold TTC1, it is judged that the first braking force is to be applied based on the arrival time threshold TTC1 set based on the external disturbance determined value SUB.

Next, the first braking quantity computing part 8C computes a first braking quantity DEC1. Based on the result of judgment on application of the braking force of the first braking force application judgment part 8B, the first braking quantity computing part 8C sets the first braking quantity DEC1 as the target value of deceleration. When the first braking force application judgment part 8B judges that the first braking force is to be applied, at a preset prescribed increase rate $\alpha$, first braking quantity DEC1 (m/s$^2$) is increased until it becomes prescribed brake quantity DEC1_0 (m/s$^2$). More specifically, in one example, the increase rate $\alpha$ is 2.5 m/s$^2$, and deceleration DEC1_0 is 2.5 m/s$^2$.

In other words, the first braking quantity DEC1=$\alpha \times t$. The first braking quantity DEC1$\leq$DEC1_0 as the first braking quantity DEC1 is set. Here, t represents the time that has lapsed from start of computing of the first braking quantity DEC1 by the first braking quantity computing part 8C. When the first braking force application judgment part 8B judges that the first braking force is not to be applied, the first braking quantity computing part 8C sets the first braking quantity DEC1 at 0.

The first braking force instruction value computing part 8D computes the first braking force instruction value. First, the first braking force instruction value computing part 8D sets a braking quantity braking force conversion coefficient correction gain $\alpha$_armyul so that it is larger when the external disturbance determined value SUB computed by the external disturbance determining part 7B is smaller (when the external disturbance hampering braking is larger). Then, based on the first braking quantity DEC1 computed by the first braking quantity computing part 8C, the first braking force instruction value computing part 8D uses the following equation (4) to compute braking force instruction value P_brk1.

$$P\_brk1 = DEC1 \times ARMYU \times \alpha\_armyul \tag{4}$$

The braking quantity braking force conversion coefficient ARMYU is a coefficient for converting the braking force instruction value (that is, the target value of the deceleration) to the hydraulic pressure value, and it has a value set in consideration of the various parameters of the vehicle. For example, ARMYU may be 0.8.

The braking quantity braking force conversion coefficient correction gain $\alpha$_armyul is set by substituting the reciprocal of the external disturbance determined value SUB with 0.8 as the lower limit and 1.2 as the upper limit. The external disturbance determined value SUB is a value determined when selection is made for the state in which the arrival time TTC is shorter than the arrival time threshold TTC1 and the first braking force is applied. Consequently, the value of external disturbance determined value SUB at the time when first braking force application judgment part 8B judges that the first braking force is to be applied (that is, the time point when the arrival time TTC is shorter than the arrival time threshold TTC1) is taken as initial value 1, and the braking quantity braking force conversion coefficient correction gain $\alpha$_armyul is set to 1. Then, together with determination of external disturbance determined value SUB, the braking quantity braking force conversion coefficient correction gain $\alpha$_armyul is corrected and set.

Also, the second threshold setting part 8E sets an arrival time threshold TTC2 as a second threshold Th2, the risk potential for judging a second braking force. Based on the external disturbance determined value SUB input from the assist information computing part 7, the second threshold setting part 8E sets the arrival time threshold TTC2 so that it is larger when the external disturbance determined value SUB is smaller (when the level of the external disturbance that hampers braking of the host vehicle MM is higher).

The second threshold setting part 8E in this embodiment determines the arrival time threshold TTC2 by a correction calculation so that it is larger when the external disturbance determined value SUB computed by the external disturbance determining part 7B is smaller (when the level of the external disturbance that suppresses or hampers the braking force generated in the vehicle is higher) with respect to the arrival time TTC2_0 as a preset prescribed value. Then, the arrival time threshold TTC2 is set as the second threshold Th2, the risk potential for judging application of the second braking force. More specifically, for example, TTC2_0 is set at 1, and TTC2 is subjected to a correction calculation and is set in the range of 0.8 to 1.2. The arrival time threshold TTC2 is set to be smaller than the arrival time threshold TTC1. For example, arrival time threshold TTC2 is computed by means of the following equation (5).

$$TTC2 = TTC2\_0 \times (1/SUB) \quad (5)$$

The second braking force application judgment part 8F judges application of the second braking force. The second braking force application judgment part 8F judges that the second braking force is to be applied when the arrival time TTC input from the assist information computing part 7 is shorter than the arrival time threshold TTC2 set at the second threshold setting part 8E. In other words, it is judged that the second braking force is to be applied when the risk potential of the host vehicle MM with respect to the obstacle XM is larger than the second threshold Th2 (when the arrival time TTC is shorter than the arrival time threshold TTC2). On the other hand, when the condition is not met, it is judged that the second braking force is not to be applied.

The second braking quantity computing part 8G computes a second braking quantity DEC2. Based on the result of judgment of application of the braking force of the second braking force application judgment part 8F, the second braking quantity computing part 8G sets the second braking quantity DEC2 as the target value of deceleration. When the second braking force application judgment part 8F judges that the second braking force is to be applied, the second braking quantity DEC2 is increased at a preset prescribed increase rate β until a preset prescribed deceleration DEC2_0.

In other words, the second braking quantity DEC2=β×t. The second braking quantity DEC2 is set with second braking quantity DEC2≤DEC2_0. Here, t represents the time that has lapsed from start of computing of the second braking quantity DEC2 of the second braking quantity computing part 8G. When the second braking force application judgment part 8B judges that the second braking force is not to be applied, the second braking quantity computing part 8G sets the second braking quantity DEC2 at 0. More specifically, for example, the increase rate β is 10.0 m/s$^2$, and DEC2_0 is 5.0 m/s$^2$.

The second braking force instruction value computing part 8H computes the second braking force instruction value. First, the second braking force instruction value computing part 8H sets a braking quantity braking force conversion coefficient correction gain α_armyu2 so that it is larger when the external disturbance determined value SUB computed by external disturbance determining part 7B is smaller. Then, based on the second braking quantity DEC2 computed by the second braking quantity computing part 8G, the second braking force instruction value computing part 811 uses the following equation to compute a braking force instruction value P_brk2.

$$P\_brk2 = DEC2 \times ARMYU \times \alpha\_armyu2 \quad (6)$$

The braking quantity braking force conversion coefficient ARMYU is a coefficient for converting the braking force instruction value (target value of deceleration) to the hydraulic pressure value, and it is set according to the various parameters of the vehicle. For example, ARMYU is taken as 0.8. The braking quantity braking force conversion coefficient correction gain α_armyu2 is set by substituting the reciprocal of external disturbance determined value SUB with 0.8 as the lower limit and 1.2 as the upper limit.

The braking force instruction value selecting part 8J takes one of the first braking force instruction value P_brk1 computed by the first braking force instruction value computing part 8D and the second braking force instruction value P_brk2 computed by the second braking force instruction value computing part 8H, whichever is larger, as the braking force instruction value P_brk. Then, the braking force instruction value selecting part 8J outputs the result of selection of the braking force instruction value P_brk to the braking force applying device 9 (braking hydraulic pressure controlling part 29) and the assist information computing part 7.

$$P\_brk = MAX(P\_brk1, P\_brk2) \quad (7)$$

The braking force applying device 9 has the braking force instruction value P_brk output from the braking force computing part 8 to the braking hydraulic pressure controlling part 29, and based on the braking force instruction value P_brk that is input, the braking hydraulic pressure controlling part 29 controls the actuator in the hydraulic circuit 27, and causes a braking force to be applied on each wheel 30. The actuator in the hydraulic circuit 27 may be a hydraulic brake actuator (a wheel cylinder or the like) that can apply hydraulic pressure on the piston in the brake caliper arranged on each wheel 30.

Figure 6:
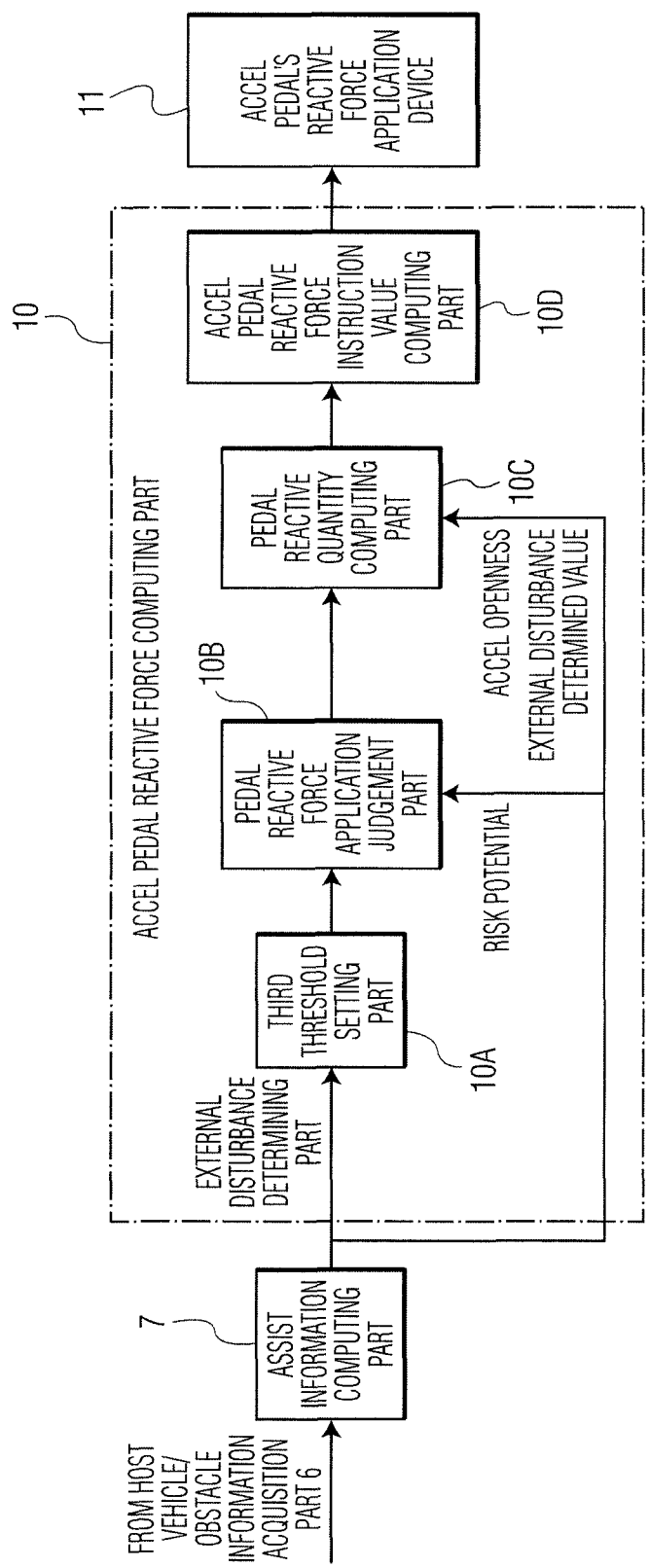
FIG. 6 is a schematic view of an accelerator reactive force computing part of the host vehicle in FIG. 1 according to an embodiment of the present invention.

FIG. 6 is a schematic view of the accelerator reactive force computing part 10 of the host vehicle in FIG. 1 according to an embodiment of the present invention. As shown in FIG. 6, the accelerator reactive force computing part 10 has a third threshold setting part 10A, an accelerator reactive force application judgment part 10B, an accelerator reactive force quantity computing part 10C, and an accelerator reactive force instruction value computing part 10D.

The third threshold setting part 10A sets an arrival time threshold TTC3 as a third threshold Th3, the risk potential for judging application of the accelerator reactive force. Based on the external disturbance determined value SUB input from the assist information computing part 7, the third threshold setting part 10A sets the arrival time threshold TTC3 so that the arrival time threshold TTC3 becomes larger when external disturbance determined value SUB is smaller (when the level of the external disturbance hampering braking of host vehicle MM is higher).

The third threshold setting part 10A in this embodiment determines the arrival time threshold TTC3 by means of a correction calculation so that it is larger when external disturbance determined value SUB is smaller with respect to an arrival time TTC3_0, a preset prescribed value. Then, the arrival time has TTC3 set. More specifically, TTC3_0 is set at 3, and TTC3 is set in the range of 2.5 to 3.5 by means of a correction calculation. For example, arrival time threshold TTC3 is computed using the following equation (8).

$$TTC3 = TTC3\_0 \times (1/SUB) \quad (8)$$

The arrival time threshold TTC3 is set so that it is larger than the arrival time threshold TTC2. In addition, it is preferred that the arrival time threshold TTC3 be set to exceed the arrival time threshold TTC1. When the arrival time threshold TTC3 is set to exceed the arrival time threshold TTC1, the resultant TTC3 may equal TTC1+TTC4, where TTC4 may be any prescribed value larger than zero.

The accelerator reactive force application judgment part 10B judges application of the accelerator reactive force. When the arrival time input from the assist information computing part 7 is shorter than the threshold TTC3 set at the third threshold setting part 10A, it judges that an accelerator reactive force is to be applied. In other words, when the risk potential of the host vehicle MM with respect to the obstacle XM is greater than the third threshold Th3 (when the arrival time TTC is shorter than the arrival time threshold TTC3), it is judged that an accelerator reactive force is to be applied. On the other hand, when the condition is not met, it is judged that an accelerator reactive force is not to be applied.

The external disturbance determined value SUB is the value determined when the arrival time TTC is shorter than the arrival time threshold TTC1 and when the state of application of the first braking force is selected. Consequently, the arrival time threshold TTC3 is TTC3_0 at the time of the first round of processing when the arrival time TTC becomes shorter than the arrival time threshold TTC3, and after that, the arrival time TTC becomes longer than the arrival time threshold TTC3. When the arrival time TTC once again becomes shorter than the arrival time threshold TTC3, it is judged that the accelerator reactive force is to be applied based on the arrival time threshold TTC3 set based on the external disturbance determined value SUB.

The accelerator reactive force quantity computing part 10C computes the accelerator reactive force. The accelerator reactive force quantity computing part 10C computes the accelerator reactive force so that it is larger when the accelerator operation state is larger. More specifically, the accelerator reactive force is computed in the range of 20-25 N. The accelerator reactive force is a reactive force that allows driver operation of the accelerator intentionally, and allows the driver to notice variation in the accelerator reactive force.

The accelerator reactive force instruction value computing part 10D computes an accelerator reactive force instruction value, and outputs it to the accelerator reactive force application device 11. In this embodiment, after the accelerator reactive force application judgment part 10B judges that the accelerator reactive force is to be applied, the accelerator reactive force instruction value is increased at a preset prescribed increase rate. After the accelerator reactive force instruction value reaches the accelerator reactive force, the accelerator reactive force instruction value is kept until the accelerator operation state input from the assist information computing part 7 becomes 0.

On the other hand, when the accelerator reactive force application judgment part 10B judges that no accelerator reactive force is to be applied, and an accelerator reactive force instruction value other than 0 was output in the last round of processing, the accelerator reactive force instruction value is decreased to 0 at a prescribed decrease rate. Then, the accelerator reactive force instruction value is set at 0 until the accelerator reactive force application judgment part 10B judges that an accelerator reactive force is to be applied. More specifically, for example, the increase rate of the accelerator reactive force instruction value is set at 7.5 N/sec, and the decrease rate is set at 30 N/sec.

In the above explanation, for the risk potential computing part 7A, the arrival time TTC is taken as a value indicating the risk potential. However, another value may indicate the proximity of the host vehicle MM to the obstacle XM, the value representing the risk potential. More specifically, the relative distance to the obstacle XM may be taken as the value indicating the risk potential. For example, if the relative distance to the obstacle XM is larger (the proximity is lower), the risk potential is lower. On the other hand, if the relative distance to the obstacle XM is smaller (the proximity is higher), the risk potential is higher. Consequently, the thresholds (relative distance thresholds) corresponding to the first threshold Th1, the second threshold Th2, and the third threshold Th3 are set based on the relative distance to the obstacle XM. More specifically, in one example, for the first threshold Th1, the relative distance threshold is set at 7 m; for the second threshold Th2, the relative distance threshold is set at 4 m; and, for the third threshold Th3, the relative distance threshold is set at 8 m. Then, when the relative distance between the host vehicle MM and the obstacle XM is smaller than each threshold, it is judged that the risk potential is larger than the risk potential represented by the threshold. Also, the risk potential computing part 7A may take the distance computed by the following equation (9) as the value representing the risk potential.

$$\text{Distance} = \text{brake reaction distance} + \text{deceleration distance} + \text{margin distance} \quad (9)$$

The brake reaction distance to the obstacle XM has a value obtained by multiplying a prescribed initial brake reaction time by relative speed V_tar. More specifically, the initial brake reaction time is set at 1 sec. The deceleration distance refers to the distance from the time when the braking force is applied to the time when the relative speed V_tar with respect to the obstacle XM becomes 0, and it is computed using the following listed equation.

$$\text{Deceleration distance} = (\text{relative speed } V\_tar) + (\text{assumed deceleration 2})/(\text{assumed deceleration change rate} \times 2)/(\text{assumed deceleration} \times 2) - (\text{assumed deceleration})2/(\text{assumed deceleration change rate} 2 \times 6) \quad (10)$$

More specifically, for example, the assumed deceleration is set at 5 m/s$^2$, and the assumed deceleration change rate is set at 10 m/s$^2$. Here, as an example, the margin distance is taken as 3 m. The assumed deceleration has a prescribed value. However, the deceleration distance may alternatively be computed based on the acceleration/deceleration of the host vehicle MM received from the host vehicle/obstacle information acquisition part 6.

Figure 7:
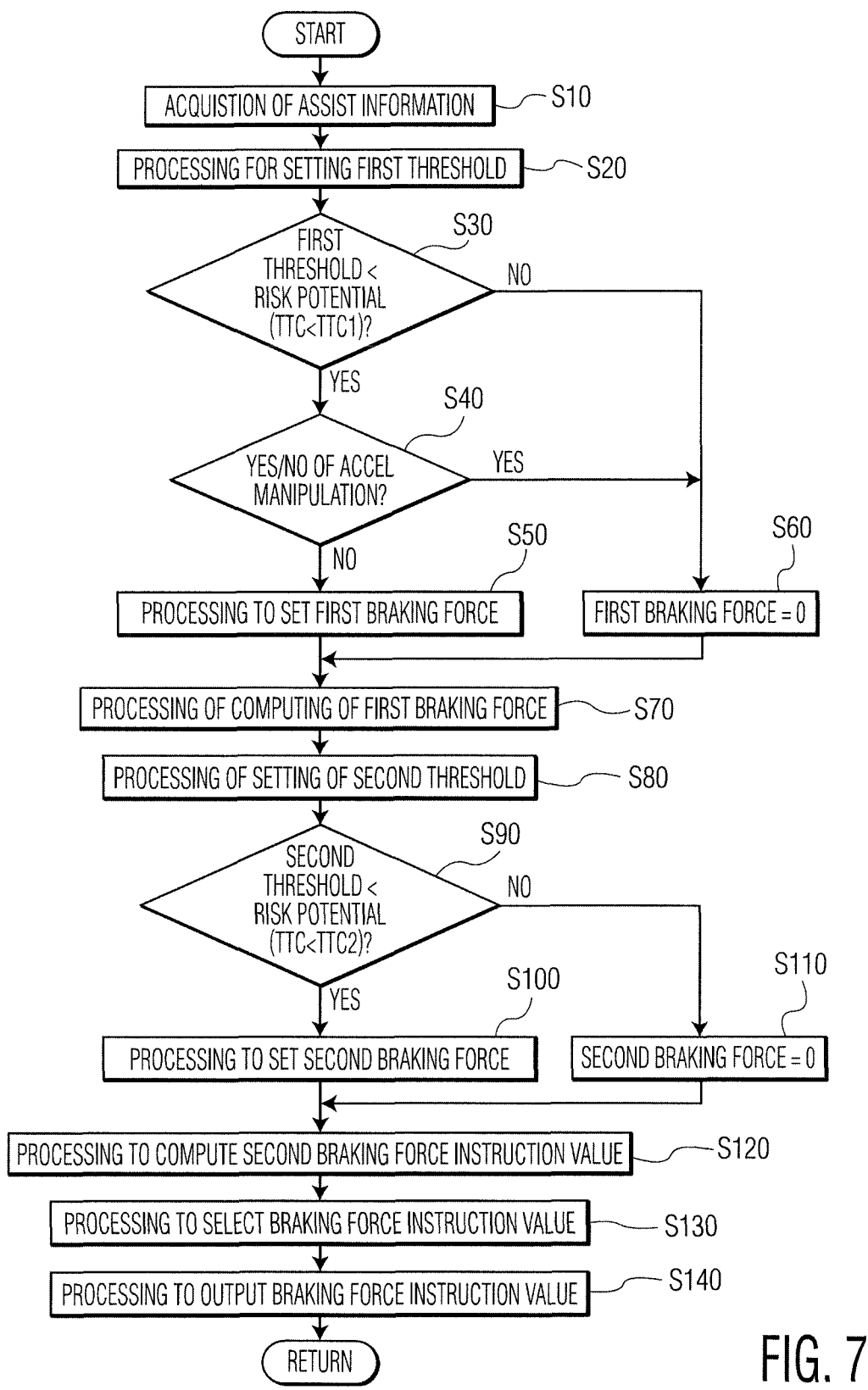
FIG. 7 is a flowchart illustrating processing carried out in the braking force computing part in FIG. 5.

Below, the processing of the braking force computing part 8 will be explained with reference to FIG. 7. The processing of the braking force computing part 8 is executed at a preset sampling period. First, in step S10, the information of the external disturbance determined value SUB and the risk potential, etc. needed for computing is acquired from assist information computing part 7.

In step S20, the first threshold setting part 8A sets the first threshold Th1.

In step S30, the first braking force application judgment part 8B judges whether the risk potential of the host vehicle MM with respect to the obstacle XM is higher than the risk potential represented by the first threshold Th1. More specifically, judgment is made on whether the arrival time TTC is shorter than the arrival time threshold TTC1. If the condition is met, the process proceeds to step S40. If not, the process proceeds to step S60.

In step S40, the first braking force application judgment part 8B judges whether the driver operates the accelerator 22. More specifically, judgment is made on whether the actual accelerator operation state exceeds a prescribed accelerator operation state that allows judgment on intentional accelerator operation by the driver. If the driver operates accelerator 22, the process proceeds to step S60. If not, the process proceeds to step S50.

In step S50, the first braking quantity computing part 8C computes the first braking quantity. Then, the process proceeds to step S70.

In step S60, the first braking quantity computing part 8C sets the first braking quantity at 0. Then, the process proceeds to step S70.

In step S70, the first braking force instruction value computing part 8D computes the first braking force instruction value based on the first braking quantity.

In step S80, the second threshold setting part 8E sets the second threshold Th2.

In step S90, the second braking force application judgment part 8F judges whether the risk potential of the host vehicle MM with respect to the obstacle XM ahead of the host vehicle MM is higher than the risk potential represented by the second threshold Th2. More specifically, judgment is made on whether the arrival time TTC is shorter than TTC2. If the condition is met, the process proceeds to step S100. If not, the process proceeds to step S110.

In step S100, the second braking quantity computing part 8G computes the second braking quantity. Then, the process proceeds to step S120.

In step S110, the second braking quantity computing part 8G sets the second braking quantity at 0. Then, the process proceeds to step 120.

In step S120, the second braking force instruction value computing part 8H computes the second braking force instruction value based on the second braking quantity.

In step S130, the braking force instruction value selecting part 8J selects one of the first braking force instruction value and the second braking force instruction value, whichever is larger, as the final braking force instruction value.

In step S140, the braking force instruction value selecting part 8J outputs the braking force instruction value selected in step S130 to the braking force applying device 9 (and in particular to the braking hydraulic pressure controlling part 29). Then, the process returns and repeats.

Figure 8:
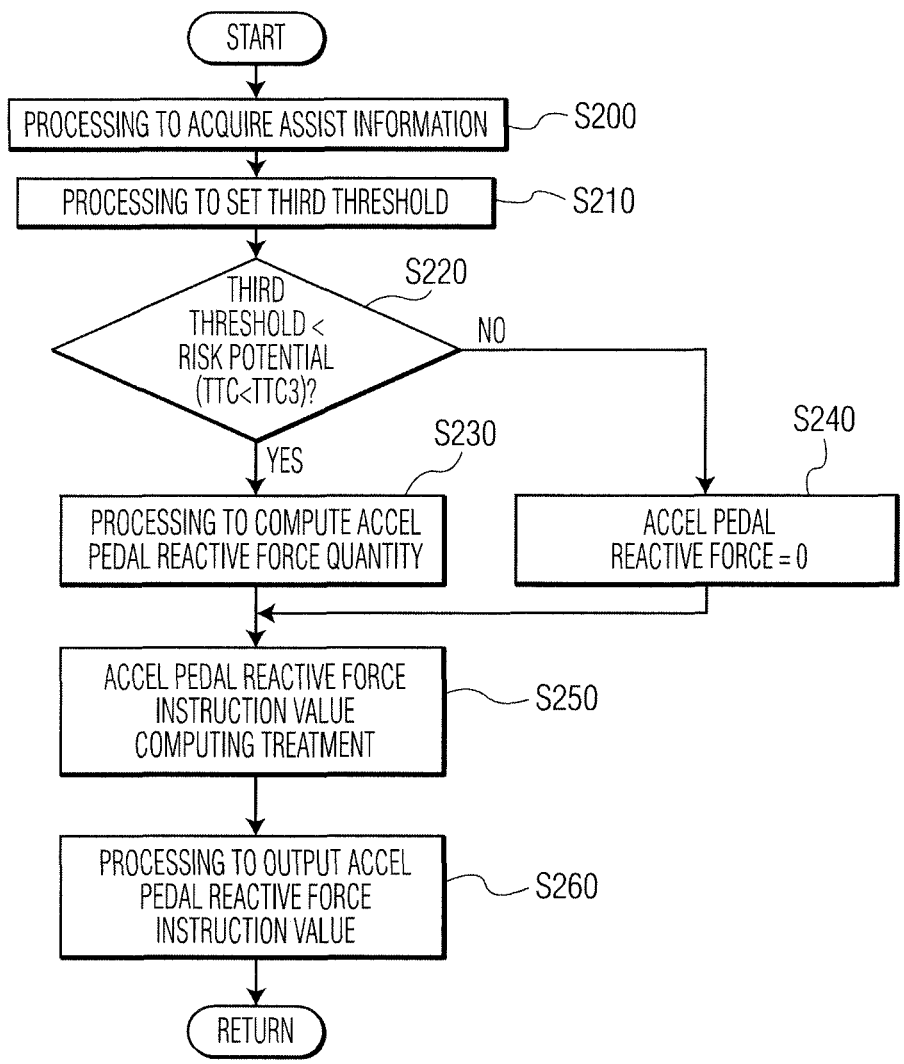
FIG. 8 is a flowchart illustrating the processing carried out in the accelerator reactive force computing part in FIG. 6.

Below, the processing of the accelerator reactive force computing part 10 will be explained with reference to FIG. 8.

The processing of the accelerator reactive force computing part 10 is executed at a preset sampling period. First, in step S200, the information of the external disturbance determined value SUB and the arrival time TTC, and any other parameters needed for computing is acquired from the assist information computing part 7.

In step S210, the third threshold setting part 10A sets the third threshold Th3.

In step S220, the accelerator reactive force application judgment part 10B judges whether the risk potential of the host vehicle MM with respect to the obstacle XM ahead of the host vehicle MM is higher than the risk potential represented by the third threshold Th3. More specifically, judgment is made on whether the arrival time TTC is shorter than the arrival time threshold TTC3. When the condition is met, the flow goes to step S230. If not, the process proceeds to step S240.

In step S230, the accelerator reactive force quantity computing part 10C computes the accelerator reactive force quantity applied on the accelerator 22. Then, the process proceeds to step S250.

In step S240, the accelerator reactive force quantity computing part 10C sets the accelerator reactive force quantity at 0, and the process proceeds to step S250.

In step S250, the accelerator reactive force instruction value computing part 10D computes the accelerator reactive force instruction value. Then, in step S260, the computed accelerator reactive force instruction value is output to the accelerator reactive force application device 11. Then, the process returns and repeats.

Figure 9:
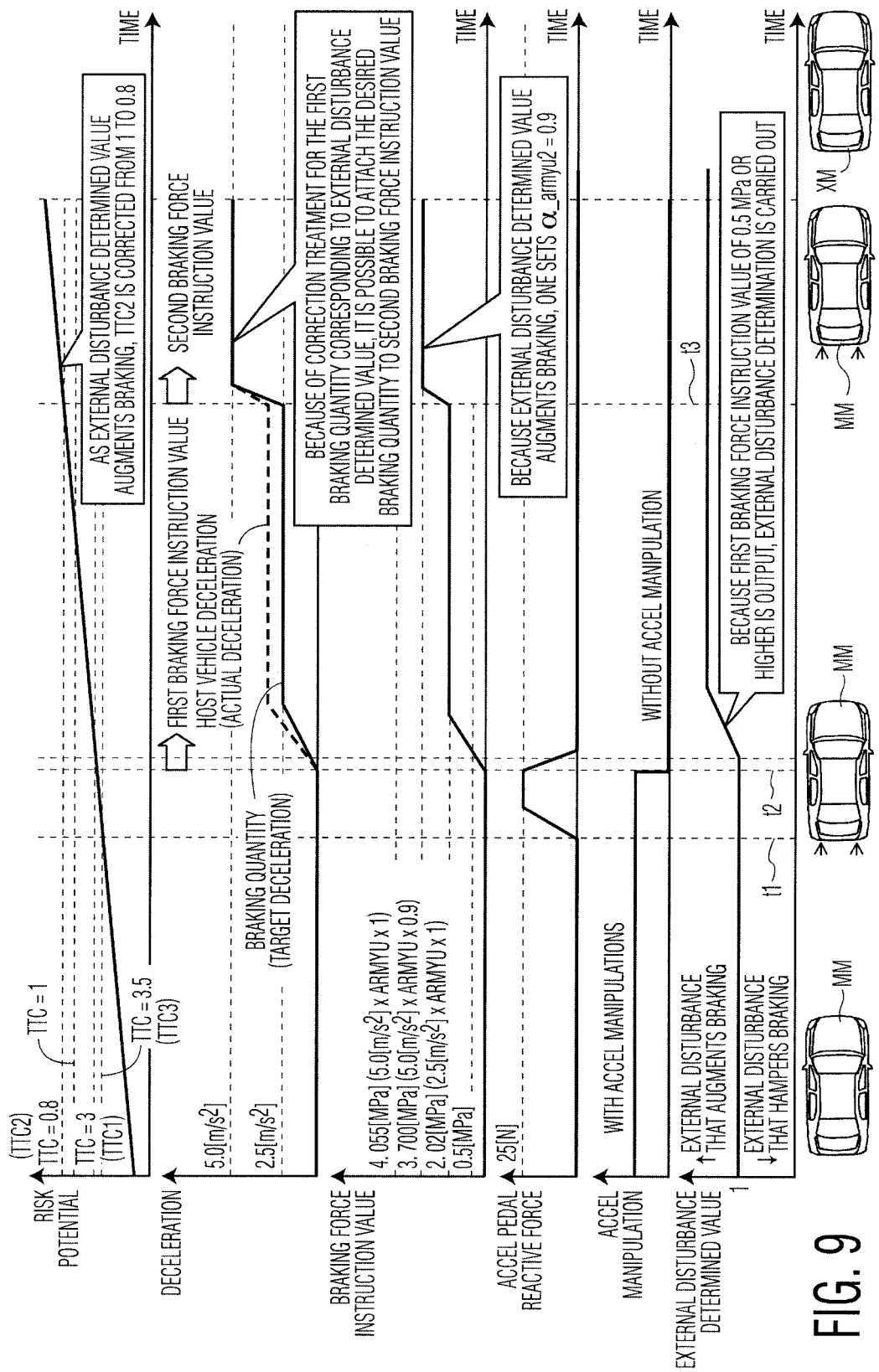
FIG. 9 is a time chart illustrating a first embodiment of a vehicle braking assist device.

FIG. 9 is a time chart illustrating the operation of the first embodiment of the present invention. As shown in FIG. 9, when the risk potential of the host vehicle MM with respect to the obstacle XM ahead of the host vehicle MM exceeds the risk potential represented by the third threshold Th3, that is, when the arrival time TTC becomes shorter than the arrival time threshold TTC3 (time t1), an accelerator reactive force is applied, so that the driver is prompted to release the accelerator 22.

In addition, when the risk potential of the host vehicle MM with respect to the obstacle XM ahead of the host vehicle MM is higher than the risk potential represented by the first threshold Th1, that is, when the arrival time TTC becomes shorter than the arrival time threshold TTC1 (time t2), a braking force corresponding to the first braking force instruction value is applied on the vehicle only if the driver does not operate the accelerator 22.

In this way, a braking force is applied by the first braking force applying means only when the accelerator 22 is not manipulated. Accordingly, a braking force is applied only when the driver does not intend to accelerate. As a result, braking is assisted only when minimal discomfort will be felt by the driver when a braking force is applied.

However, when the risk potential of the host vehicle MM with respect to the obstacle XM ahead of the host vehicle MM exceeds the risk potential represented by the second threshold Th2, that is, when the arrival time TTC becomes shorter than the arrival time threshold TTC2 (time t3), a braking force corresponding to the second braking force instruction value is applied on the vehicle irrespective of the operation state of the accelerator 22. The second braking force instruction value is set to be higher than the first braking force instruction value. As a result, braking is carried out by the second braking force instruction value irrespective of the operation state of the accelerator 22, so that a braking force is applied reliably, and the driving operation of the driver can be assisted.

By setting the risk potential represented by the third threshold Th3 at a value smaller than the risk potential represented by the first threshold Th1 (by setting the arrival time threshold TTC3 at a value that exceeds the arrival time threshold TTC1), an accelerator reactive force is applied, so that it is possible to determine the intention of the driver in operating the accelerator 22, before a braking force is applied based on the first braking force instruction value, so it is possible to determine the intention of the driver at a more effective timing.

That is, as explained above, the driver who fails to determine the risk with respect to the obstacle XM is assisted by means of the accelerator reactive force. In this case, when the driver has an intention of deceleration, the accelerator reactive force prompts the driver to release the accelerator 22. Then, at the same time or subsequently, braking is applied based on the first braking force instruction value, so that it is possible to efficiently assist braking minimal discomfort.

On the other hand, when the driver has no intention to decelerate, the accelerator 22 is not released although there is an accelerator reactive force. In this way, it is possible to suppress application of the braking force by the first braking force application means in a scenario that when applying a braking force would cause discomfort.

Also, corresponding to the external disturbance determined value SUB, correction is made for the values set or computed by the first threshold setting part 8A, the first braking force application judgment part 8D, the second threshold setting part 8E, the second braking quantity computing part 8G, and the third threshold setting part 10A. As a result, in the case where the external disturbance hampers braking (when the deceleration actually generated in the vehicle decreases with respect to the braking hydraulic pressure due to the external disturbance), it is possible to assist with an appropriate braking quantity at a quicker timing. In the example shown in FIG. 9, it is determined that an external disturbance augmenting braking is generated based on the external disturbance when the first braking quantity DEC1 is generated (the deceleration actually generated in the vehicle with respect to a braking hydraulic pressure increase due to the external disturbance). In this case, based on the external disturbance determined value SUB, the first braking instruction value is corrected to become smaller, and, at the same time, a correction is carried out so that the risk potential represented by the second threshold Th2 becomes higher (so that the arrival time threshold TTC2 becomes lower). In the example shown in FIG. 9, the value of the second threshold Th2 is corrected from 1 to 0.8. As a result, when the risk potential of the host vehicle MM with respect to the obstacle XM is higher, it is possible to apply a braking quantity as the target of the second braking force application means.

Also, by determining an external disturbance that influences the braking quantity generated by the braking force based on the wheel velocity and the braking force of the host vehicle MM in the external disturbance determining part 7B, it is possible to determine an external disturbance caused by, e.g., pad friction μ at the frictional brake, road surface friction μ, vehicle weight, and other parameters.

Additionally, by determining an external disturbance when a braking force is applied based on the first braking force instruction value in external disturbance determining part 7B, it is possible to determine an external disturbance pertaining to the braking force based on the second braking force instruction value more correctly. That is, by correcting the second threshold Th2 (the arrival time threshold TTC2) and the second braking force instruction value P_brk2 based on an external disturbance when the braking force is applied based on the first braking force instruction value, it is possible to apply the braking force with the second braking force application means more appropriately.

In this embodiment, the external disturbance determined value SUB is computed based on the acceleration/deceleration that is determined based on the wheel velocity and the braking force instruction value. That is, the external disturbance determined value SUB is computed based on the braking force instruction value and the acceleration/deceleration determined based on the wheel velocity. Usually, the friction included between the braking force application mechanism that generates the braking force by the braking hydraulic pressure and the wheel is very small. Thus, by computing the external disturbance determined value SUB based on the braking force instruction value and the wheel velocity, it is possible to determine the external disturbance determined value SUB at a high precision.

In this embodiment, the risk potential computing part 7A forms the risk potential computing means, and the accelerator operation state sensor 3 forms the accelerator detecting means. The first braking force application means is composed of the first threshold setting part 8A, the first braking force application judgment part 8B, the first braking quantity computing part 8C, the first braking force instruction value computing part 8D, the braking force instruction value selecting part 8J, and the braking force applying device 9. The second braking force application means is composed of the second threshold setting part 8E, the second braking force application judgment part 8F, the second braking quantity computing part 8G, the second braking force instruction value computing part 8H, the braking force instruction value selecting part 8J, and the braking force applying device 9. The accelerator reactive force application means is made of the accelerator reactive force computing part 10. The external disturbance determining means is made of the external disturbance determining part 7B. First through fourth correction means are made of the first braking force instruction value computing part 8D and the second braking force instruction value computing part 8H.

Effect of the First Embodiment:

(1) The risk potential computing means computes the risk potential of the host vehicle MM with respect to the obstacle XM ahead of the host vehicle MM. The first braking force application means applies a braking force on the host vehicle MM when the computed risk potential is higher than the preset first threshold and it is judged that the accelerator 22 is not operated based on detection of the accelerator detection means. The second braking force application means applies a braking force on the host vehicle MM irrespective of the operation state of the accelerator 22 when the risk potential computed by the risk potential computing means exceeds the second threshold that is higher than the first threshold.

As a result, when the risk potential is higher than the second threshold with respect to the obstacle XM ahead of the host vehicle MM, braking is reliably applied to assist. On the other hand, when the risk potential is between the first threshold, which is lower than the second threshold, and the second threshold, the braking force is applied only when the driver has no intention to accelerate. As a result, it is possible to assist braking only when minimal discomfort will be felt when a braking force is applied corresponding to the intention of the driver. Therefore, it is possible to appropriately assist driving by braking the host vehicle with respect to the obstacle XM ahead of the host vehicle MM in a manner corresponding to the intention of the driver.

(2) The accelerator reactive force application means applies a reactive force to the accelerator when it is judged that the risk potential determined by the risk potential computing means is higher than a preset third threshold. As a result, an accelerator reactive force is applied for the driver who fails to notice the risk with respect to the obstacle XM, so that the driver is notified of the high risk potential, and, at the same time, the driver is prompted to release the accelerator 22, so that driving can be assisted.

Further, after it is found that the driver has released the accelerator 22 and shows an intention of deceleration upon the accelerator reactive force, braking can be carried out based on the first braking force instruction value. As a result, it is possible to carry out efficient assistance with an even lower feeling of discomfort. On the other hand, when the driver has an intention to accelerate, he/she can continue operating the accelerator 22 to accelerate irrespective of the accelerator reactive force. As a result, it is possible to not apply the braking force in a when application of a braking force would cause discomfort.

(3) The risk potential represented by the third threshold is equal to or lower than the risk potential represented by the first threshold. Since the risk potential represented by the third threshold is set lower than the risk potential represented by the first threshold, it is possible to apply an accelerator reactive force at the same time or earlier than start of application of braking based on the first braking force instruction value. As a result, it is possible to determine the intention of the driver and start application of braking based on the first braking force instruction value.

(4) The risk potential computing means computes the proximity as the value representing the risk potential with respect to the obstacle XM. Based on the proximity computed by the risk potential computing means, the first braking force application means and the second braking force application means judge that the risk potential of the host vehicle with respect to the obstacle in the travelling direction of the host vehicle is higher than the first threshold as the preset risk potential, and that it is also higher than the second threshold as the preset risk potential. By having the value representing the risk potential as the proximity with respect to the obstacle XM, it is possible to appropriately assist with minimal driver discomfort.

(5) The risk potential computing means computes the proximity based on at least one of the following parameters: the relative distance between the host vehicle MM and the obstacle XM, the relative speed between the obstacle XM and the host vehicle MM, and the relative acceleration/deceleration between the host vehicle MM and the obstacle XM. Since the proximity is computed based on at least one of the relative distance, relative speed, and relative acceleration/deceleration between the host vehicle MM and the obstacle XM, the risk potential is determined based on a physical quantity, and it is possible to set the risk potential similar to that based on the comfort level of the driver.

(6) The risk potential computing means computes the risk potential based on the arrival time determined for the host vehicle MM to reach the position of the obstacle XM. By judging the possibility of assistance by means of the risk potential based on the arrival time to the obstacle XM, it is possible to perform assist at a timing with minimal discomfort.

(7) The external disturbance determining means determines an external disturbance that influences braking applied on the host vehicle MM. When there is a high level of suppression of braking applied on the host vehicle MM due to an external disturbance determined by the external disturbance determining means, the first correction means compares this with the case when the suppression level is lower, and has at least one of the first threshold and second threshold corrected to a lower level of risk potential. In a state in which the external disturbance hampers braking, assistance can be carried out at a quicker timing. In a state in which the external disturbance augments braking, assistance can be carried out at a slower timing. Thus, it is possible to carry out assistance to driving at an appropriate timing corresponding to the external disturbance.

(8) When there is a high level of suppression of braking applied on the host vehicle MM due to an external disturbance determined by the external disturbance determining means, the second correction means compares this with the case when the suppression level is lower, and has the third threshold corrected to a lower level of risk potential. In a state in which the external disturbance hampers braking, assistance can be carried out at a quicker timing. In a state in which the external disturbance augments braking, assistance can be carried out at a slower timing. Thus, it is possible to carry out assist to driving at an appropriate timing corresponding to the external disturbance.

(9) When there is a high level of suppression of braking applied on the host vehicle MM due to an external disturbance determined by the external disturbance determining means, the third correction means compares this with the case when the suppression level is lower, and has the braking force applied by the first braking force application means or the second braking force application means corrected to be larger. It is possible to perform assistance by an appropriate braking quantity corresponding to either hampering or augmenting of braking by the external disturbance.

(10) When there is a high level of suppression of braking applied on the host vehicle MM due to an external disturbance determined by the external disturbance determining means, the fourth correction means compares this with the case when the suppression level is lower, and has the reactive force applied by the accelerator reactive force application means corrected to be larger. It is possible to perform assistance by an appropriate accelerator reactive force corresponding to either hampering or augmenting of braking by the external disturbance.

(11) When a braking force is applied by the first braking force application means, the external disturbance determining means determines the external disturbance. Then, based on the external disturbance determined by the external disturbance determining means, at least one of the second threshold and the braking force applied by the first braking force application means is corrected. Corresponding to the external disturbance determined when the braking force is applied by the first braking force application means, at least one of the second threshold and the braking force by the first braking force application means is corrected. Thus, in a state when the risk potential is higher than the second threshold, application of braking by the second braking force application means is started at an appropriate timing, or the braking force can be set at a more appropriate value by the first braking force application means.

(12) Based on the acceleration/deceleration computed based on the wheel velocity of the host vehicle MM and the braking force instruction value for the host vehicle MM, the external disturbance determining means determines the external disturbance.

Modified Examples

Based on the constitution of the first embodiment, the variations explained below can be incorporated appropriately.

(2) In the first embodiment, as an example, all of the thresholds, including the first threshold Th1, the second threshold Th2, and the third threshold Th3, are corrected corresponding to the external disturbance determined value SUB. However, the present invention is not limited to this scheme. For example, only one or two of the first threshold Th1, the second threshold Th2, and the third threshold Th3 may be corrected.

(3) In the first embodiment, as an example, both the first braking force instruction value P_brk1 and the second braking force instruction value P_brk2 are corrected corresponding to the external disturbance determined value SUB. However, the present invention is not limited to the scheme. For example, only one of the first braking force instruction value P_brk1 and the second braking force instruction value P_brk2 may be corrected corresponding to the external disturbance determined value SUB.

(4) In the first embodiment, as an example, the first threshold Th1, the second threshold Th2, the third threshold Th3, the first braking force instruction value P_brk1, and the second braking force instruction value P_brk2 are corrected corresponding to the external disturbance determined value SUB. However, the present invention is not limited to the scheme. For example, the following appropriately adjusted schemes may also be adopted: one or several of the first threshold Th1, the second threshold Th2, and the third threshold Th3 may be corrected, or only one of the first braking force instruction value P_brk1 and the second braking force instruction value P_brk2 may be corrected, or one or several of the first threshold Th1, the second threshold Th2, and the third threshold Th3 as well as one or both of the first braking force instruction value P_brk1 and the second braking force instruction value P_brk2 may be corrected.

A second embodiment of the present invention will be explained with reference to figures. Here, the same symbols as those above in the first embodiment will be adopted in the explanation.

The fundamental constitution of the second embodiment is the same as that of the first embodiment. However, the second embodiment differs in that the risk potential is computed based on a picture taken of the scene ahead of the host vehicle MM. More specifically, from the information of the obstacle XM with its image included in the picture that has been taken, the proximity to the obstacle XM is computed. That is, the influence of the obstacle XM with its image included in the picture that is taken is computed as a value representing the risk potential.

In particular, the obstacle information computing part 6C is constituted by a camera or other picture taking means. The picture taking means is arranged in front of the host vehicle MM for taking pictures ahead of the vehicle. The risk potential computing part 7A computes the proximity (that is, the value representing the risk potential) from the proportion of the obstacle XM on the picture taken of the scene ahead of the host vehicle MM. For example, the proportion of the target image on the image area is computed as the proximity. For a picture taken by the picture taking means, the risk potential computing part 7A adopts a preset picture frame, and the proportion of the obstacle XM ahead of the host vehicle MM within the picture frame is computed as the proximity.

Obstacles XM located outside the lane of the host vehicle MM may also be taken within the picture frame. In this case, processing for recognizing the lane of the host vehicle in the picture is carried out, and processing is carried out to exclude obstacles XM located outside the lane of the host vehicle MM from the obstacle XM which is inside the lane of the host vehicle MM and used to compute the proportion. For example, recognition of the lane of the host vehicle may be carried out by judging white mark lines and the road shoulder. Also, recognition of the lane of the host vehicle may be carried out by predicting the travelling path of the host vehicle based on the behavior of the host vehicle MM (the lateral acceleration, steering angle, and other parameters applied on host vehicle MM), and recognizing the lane by means of the predicted travelling path.

Figure 10:
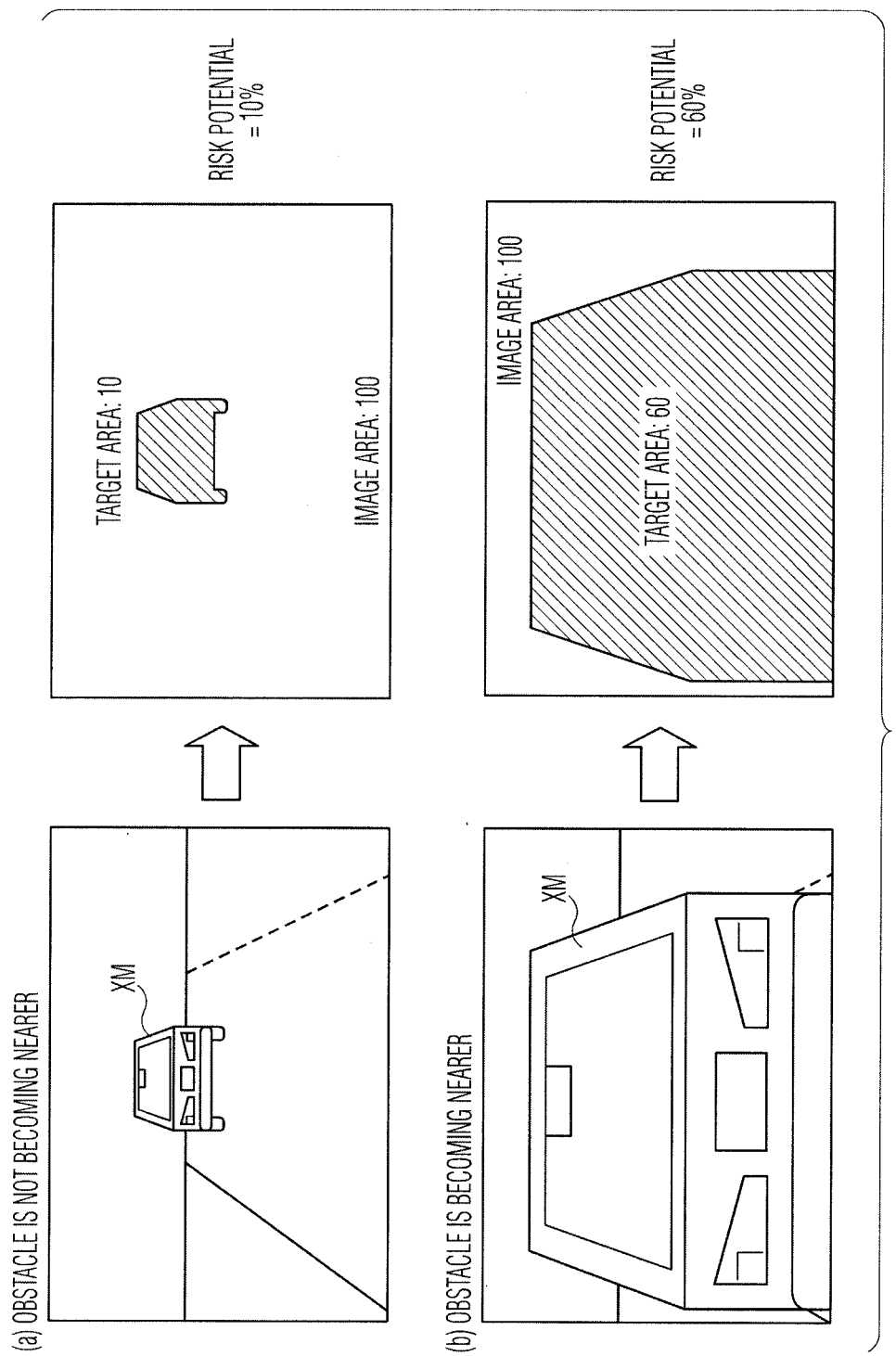
FIG. 10 is a pictorial view illustrating an example of computing of the risk potential pertaining to a second embodiment of a vehicle braking assist device.

When a picture is taken for the same obstacle XM, and when the host vehicle MM does not approach the obstacle XM, the proportion of the obstacle XM in the picture frame (proportion) becomes smaller as shown in FIG. 10(a). On the other hand, when the host vehicle MM approaches the obstacle XM, the proportion becomes larger as shown in FIG. 10(b). Consequently, the larger the proximity of the host vehicle to the obstacle XM, that is, the larger the risk potential, the larger the proportion.

The thresholds for the proportion of the obstacle XM on the picture ahead of the host vehicle MM are set by means of the first threshold setting part 8A, the second threshold setting part 8E, and the third threshold setting part 10A. More specifically, the initial value of the first threshold Th1 is set at 45%, the initial value of the second threshold Th2 is set at 60%, and the initial value of the third threshold Th3 is set at 45%.

As in the first embodiment, the first threshold Th1, the second threshold Th2, and the third threshold Th3 are corrected based on the external disturbance determined value SUB. That is, the various thresholds are corrected so that the larger the external disturbance that hampers braking, the larger the risk potential represented by each threshold (the larger each threshold), and the various thresholds are corrected so that the larger the external disturbance that augments braking, the smaller the risk potential represented by each threshold (the smaller each threshold). The remaining features of the constitution are the same as those in the first embodiment.

In sum, in the second embodiment, the proportion of the obstacle XM in the area of the picture is computed as the proximity (that is, as the value indicating the risk potential). However, the present invention is not limited to the scheme. One may also adopt a scheme in which the area of the obstacle XM as a picture taken of itself is taken as the proximity, or the width of the obstacle XM as a picture taken is taken as the proximity.

In operation of the second embodiment, the risk potential is determined by detecting the proximity to the obstacle XM based on a picture taken of the scene ahead of the host vehicle MM. In this way, according to this embodiment, there is no need to use a device to detect the distance to the obstacle XM, and assistance can be carried out with a picture taking means that takes a picture of the scene ahead of the host vehicle MM.

The effect of the second embodiment is based on the picture taken of the scene ahead of the host vehicle MM is obtained with the picture taking means. The risk potential computing means determines the proximity based on the obstacle XM included in the picture taken by the picture taking means, and the risk potential is computed. Thus, it is possible to set the risk potential as a value similar to the viewing state of the driver for the obstacle XM.

A third embodiment will be explained with reference to figures. Here, the same symbols as those above in first and second embodiments are adopted in the explanation for this embodiment. The fundamental constitution of the third embodiment is the same as that of the first embodiment.

However, the third embodiment differs from the first embodiment 1 in the method for determining the external disturbance by the external disturbance determining part and in the method for correcting the first braking quantity and the second braking quantity corresponding to the determined external disturbance.

In the third embodiment, the external disturbance determining part 7B determines the external disturbance from acceleration/deceleration A of the host vehicle MM input from the host vehicle/obstacle information acquisition part 6 and the braking force instruction value P_brk0. Assuming that the braking quantity braking force conversion coefficient used by the first braking force instruction value computing part 8D is ARMYU, the following equation is used to compute external disturbance determined value SUB.

$$SUB = (P\_brk0/ARMYU) - A \qquad (11)$$

The external disturbance determined value SUB is computed from the difference between the braking force (braking hydraulic pressure) according to the braking force instruction value and the actual acceleration/deceleration. When the external disturbance determined value SUB is not computed, external disturbance determined value SUB is set at 0. As can be seen from equation (11), the external disturbance determined value SUB shows the level of influence of the external disturbance on the braking force generated in the host vehicle MM. The external disturbance includes at least one of the road slope and the air drag.

If the external disturbance that influences the braking quantity that generates the braking force is an external disturbance that augments braking (that is, an external disturbance that increases the deceleration with respect to the braking hydraulic pressure), the external disturbance determined value SUB is a value smaller than 0. On the other hand, if the external disturbance that influences the braking quantity that generates the braking force is an external disturbance that hampers braking (that is, an external disturbance that decreases the deceleration with respect to the braking hydraulic pressure), the external disturbance determined value SUB is a value larger than 0.

The first braking quantity computing part 8C sets a larger value of the braking quantity correction quantity β_dec1 when the external disturbance determined value SUB computed by the external disturbance determining part 7B is larger (when the external disturbance that hampers braking is larger). Then, the first braking quantity DEC1 is computed by adding the braking quantity correction quantity β_dec1 to the preset prescribed deceleration DEC1_0.

$$DEC1 = DEC1\_0 + \beta\_dec1 \quad (12)$$

More specifically, the braking quantity correction quantity β_dec1 is set by substituting the value of the external disturbance determined value SUB, with $-2.5$ m/s$^2$ as the lower limit and with $2.5$ m/s$^2$ as the upper limit. Based on the first braking quantity DEC1 computed by the first braking quantity computing part 8C, the first braking force instruction value computing part 8D uses the following equation to compute the first braking force instruction value P_brk1.

$$P\_brk1 = DEC1 \times ARMYU \quad (13)$$

The braking quantity braking force conversion coefficient ARMYU is a conversion coefficient for converting the braking quantity to the braking hydraulic pressure. Then, the second braking quantity computing part 8G sets a larger value of the braking quantity correction quantity β_dec2 for a larger external disturbance determined value SUB (a larger external disturbance that hampers braking) computed by the external disturbance determining part 7B. Then, the second braking quantity DEC2 is computed by adding the braking quantity correction quantity β_dec2 to the preset prescribed deceleration DEC2_0.

$$DEC2 = DEC2\_0 + \beta\_dec2 \quad (14)$$

More specifically, the braking quantity correction quantity β_dec2 is set by substituting the sign-inverted value of the external disturbance determined value SUB with $-2.5$ m/s$^2$ as the lower limit and with $2.5$ m/s$^2$ as the upper limit. Then, based on the second braking quantity DEC2 computed by the second braking quantity computing part 8G, the second braking force instruction value computing part 8H computes the braking force instruction value P_brk by means of the following equation.

$$P\_brk2 = DEC2 \times ARMYU \quad (15)$$

Figure 11:
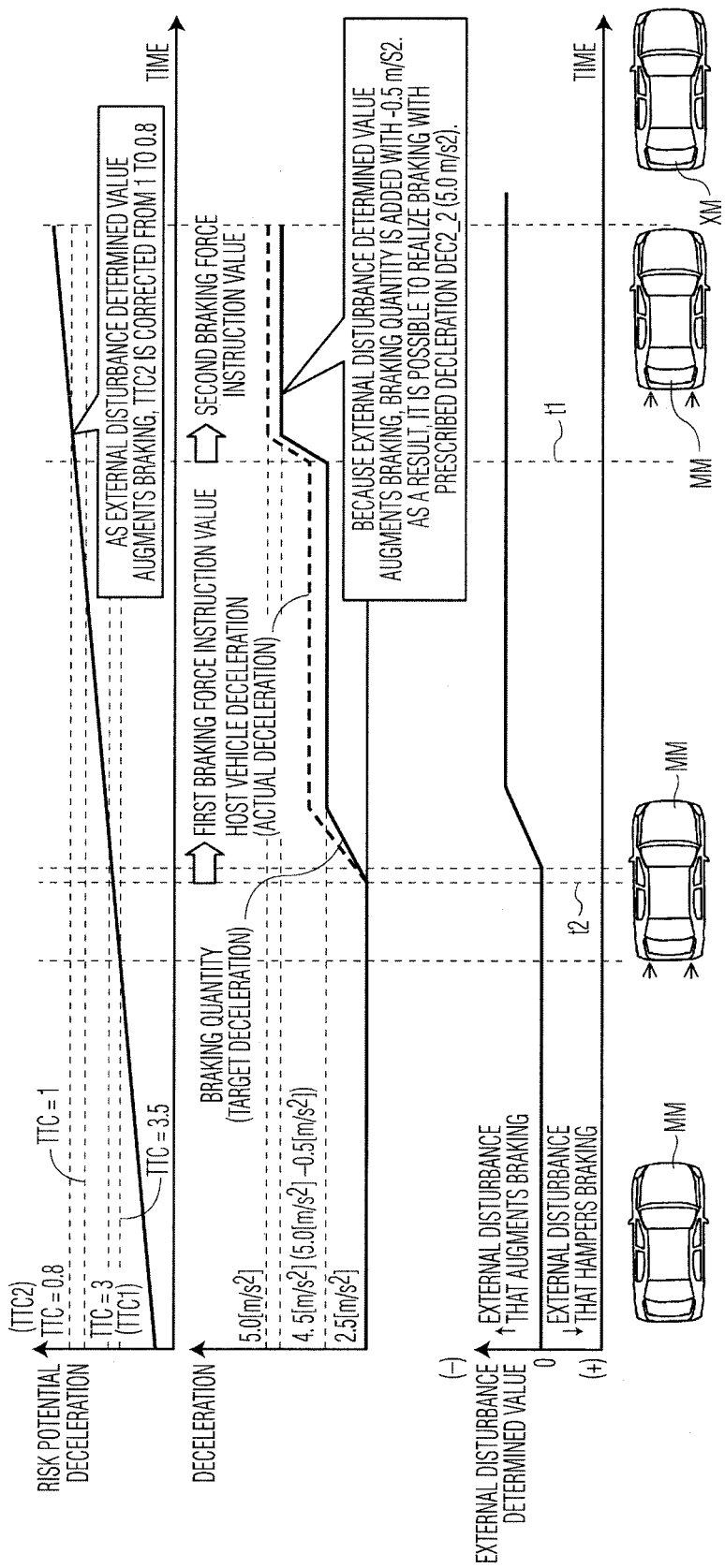
FIG. 11 is a time chart illustrating a third embodiment of a vehicle braking assist device.

FIG. 11 is a time chart illustrating the operation of the third embodiment of the present invention. In this time chart, the time chart for the accelerator reactive force is not shown. In the example shown in FIG. 11, a braking force is applied on the vehicle corresponding to the first braking force instruction value when the risk potential of the host vehicle MM with respect to the obstacle XM ahead of the host vehicle MM is higher than the risk potential represented by the first threshold Th1, that is, when the arrival time TTC is shorter than the arrival time threshold TTC1 (time t2), and the driver does not operate the accelerator 22.

In this way, a braking force is applied by the first braking force application means only when the accelerator 22 is not operated. Consequently, a braking force is applied only when the driver does not intend to accelerate, so that it is possible to assist braking with minimal discomfort when a braking force is applied. On the other hand, a braking force is applied on the vehicle corresponding to the second braking force instruction value irrespective of accelerator operation by the driver when the risk potential of the host vehicle MM with respect to the obstacle XM ahead of the host vehicle MM is higher than the risk potential represented by the second threshold Th2, that is, when the arrival time TTC is shorter than the arrival time threshold TTC2 (time t3). In addition, the second braking force instruction value is set to be larger than the first braking force instruction value.

As a result, by performing braking with the second braking force instruction value computed when the risk potential is higher even than the first threshold Th1 (the threshold for judging start of computing of the first braking force instruction value), it is possible to perform assistance with braking that can avoid contact with the obstacle XM even when the relative speed V_tar with respect to the obstacle XM is high.

In addition, an external disturbance that influences the braking quantity that generates the braking force is determined. In the example shown in FIG. 11, the external disturbance determined value SUB determines an external disturbance that augments braking (deceleration). Consequently, while the first braking instruction value is corrected to be smaller, correction is carried out so that the risk potential represented by the second threshold Th2 becomes larger (that is, the arrival time threshold TTC2 becomes smaller). In the example shown in FIG. 11, the value of second threshold Th2 is corrected from 1 to 0.8. As a result, it is possible to apply a braking quantity sought by the second braking force application means when the risk potential of the host vehicle MM with respect to the obstacle XM is high.

In this way, according to the third embodiment, by determining an external disturbance with respect to the braking quantity that generates the braking force and by correcting the braking quantity corresponding to the determined external disturbance, it is possible to decrease the influence of an external disturbance that influences the control quantity, such as the road slope, air drag, an other parameters.

The effect of the third embodiment is based on the external disturbance determining means determining an external disturbance that influences the braking force generated in host vehicle MM, and, at the same time, correcting the braking quantity corresponding to the determined external disturbance. Thus, it is possible to decrease the influence of the external disturbance caused by road slope, air drag, and other parameters on the braking force.

A fourth embodiment will be explained with reference to figures. The same symbols as those above in the first, second, and third embodiments are adopted in the explanation. The fundamental constitution of this embodiment is the same as that of the first three embodiments. However, it differs from those embodiments in the processing for determining an external disturbance.

In the first embodiment, the external disturbance determined value SUB is computed when the risk potential of the host vehicle MM with respect to the obstacle XM ahead of the host vehicle MM is higher than the risk potential represented by the first threshold Th1, and when the first braking is executed.

In contrast, in the fourth embodiment, the external disturbance determined value SUB is computed before the risk potential of the host vehicle MM with respect to the obstacle XM ahead of the host vehicle MM, and the first threshold Th1 is set based on the computed value of the external disturbance determined value SUB. That is, the external disturbance determining part determines the external disturbance based on the engine torque and the transmission position, even when braking assistance is not carried out.

More specifically, the external disturbance determining part 7B acquires the gear ratio GP of the transmission gear unit being selected based on the transmission position. When the vehicle's transmission is a stepless transmission, the gear ratio may be computed by detecting the input/output rotation velocities of the transmission.

The following equation is used to compute acceleration determined value A_tar generated in consideration of the engine torque acquired from the host vehicle/obstacle information acquisition part 6, the gear ratio, as well as a prescribed the torque ratio, the differential gear ratio, the vehicle weight, and the tire radius set based on the various parameters of the vehicle.

$$A\_tar=\text{engine torque} \times \text{transmission gear ratio} \times \text{torque ratio} \times \text{differential gear ratio} / \text{vehicle weight} / \text{tire radius} \quad (16)$$

Then, when it is detected that the driver operates the accelerator 22, the external disturbance determined value SUB is computed based on the accelerator operation state input from the host vehicle/obstacle information acquisition part 6. That is, the following equation is used to compute the external disturbance determined value SUB based on the acceleration determined value A_tar and the acceleration/deceleration A input from the host vehicle/obstacle information acquisition part 6.

$$SUB=A\_tar-A \quad (17)$$

When the driver does not operate the accelerator 22, the same method as that used in the first and third embodiments is adopted to compute the external disturbance determined value SUB from the braking instruction value. That is, when the first braking is executed, the external disturbance determined value SUB is computed based on the braking force instruction value when the first braking is executed and the actual deceleration. When the first braking is not executed, the external disturbance determined value SUB is computed using the method.

Also, an adjustment is made so that a difference in the reference of the external disturbance determined value SUB is absorbed using the method for computing the external disturbance determined value SUB. For example, for the external disturbance determined value SUB computed in the first embodiment 1, when there is no influence of an external disturbance, SUB is set at 1, so that when the external disturbance determined value SUB is computed using the method of the first embodiment, for example, 1 is subtracted, and the reference is set at 0.

Then, based on the external disturbance determined value SUB, the various thresholds and control quantities are corrected just as in the first and third embodiments. For an electric automobile or another vehicle that does not use engine 23 as the power source, acceleration determined value A_tar is computed by means of computing that is the same as the aforementioned computing.

Figure 12:
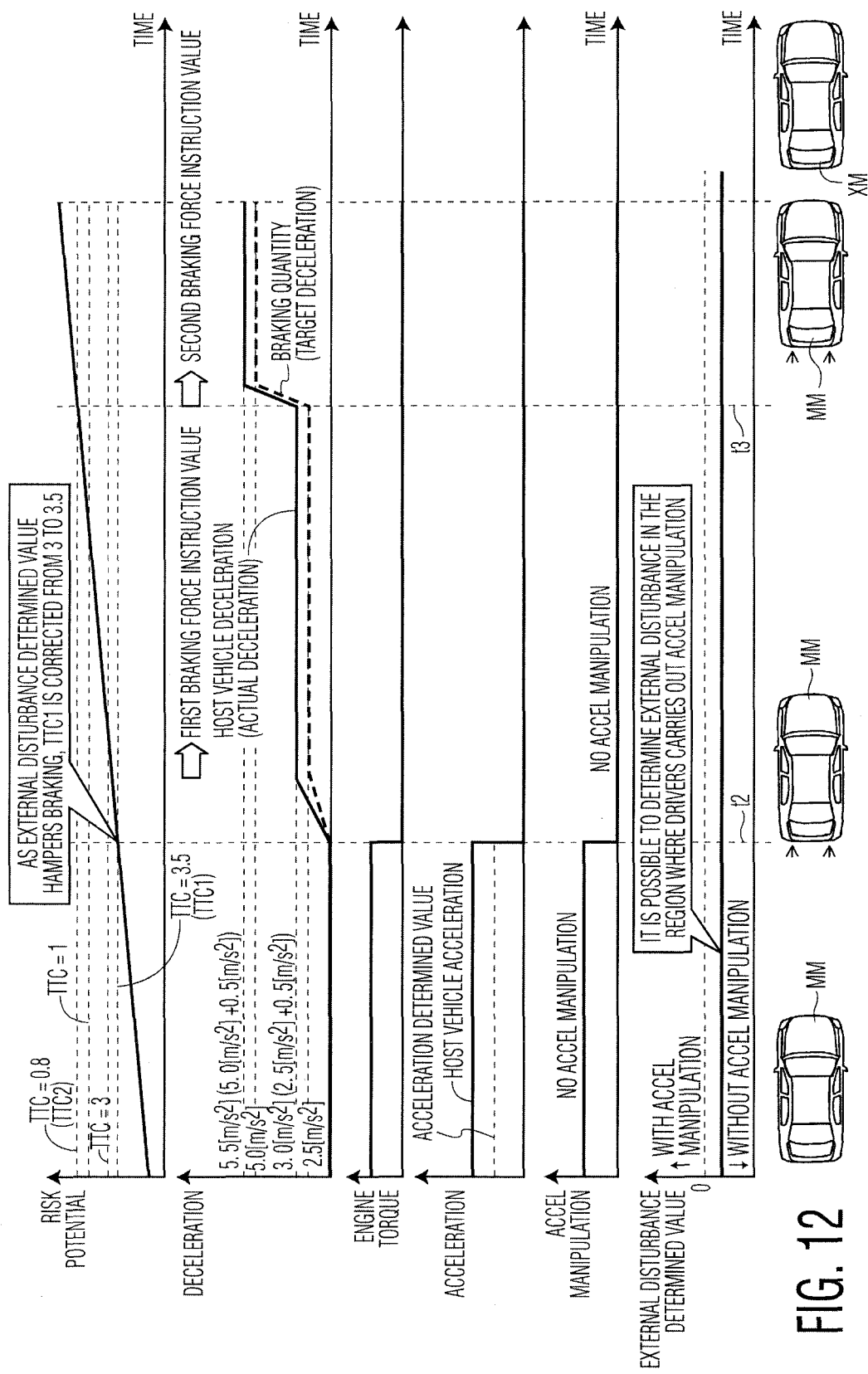
FIG. 12 is a time chart illustrating a fourth embodiment of a vehicle braking assist device.

FIG. 12 is a time chart illustrating the operation of the fourth embodiment of the present invention. In this time chart shown in FIG. 12, the time chart for the accelerator reactive force is not shown. As shown in the time chart of FIG. 12, even when the risk potential of the host vehicle MM with respect to the obstacle XM ahead of the host vehicle MM is lower than the risk potential represented by the first threshold Th1 and the third threshold Th3 (when the arrival time TTC is longer than the arrival time threshold TTC1 and the arrival time threshold TTC3), that is, even before driving is assisted by means of braking and a accelerator reactive force, an external disturbance is determined by detecting the engine torque.

As a result, it is possible to correct the first threshold Th1 (the arrival time threshold TTC1) and the third threshold Th3 (the arrival time threshold TTC3) as references for judging the start of braking and accelerator reactive force to appropriate values corresponding to the state of the external disturbance.

Also, by computing the external disturbance determined value SUB based on braking after the risk potential of the host vehicle MM with respect to the obstacle XM ahead of the host vehicle MM becomes larger than the risk potential represented by the first threshold Th1 (when the arrival time TTC becomes shorter than the arrival time threshold TTC1) and braking assistance is started, just as in the first three embodiments, it is possible to appropriately correct the second threshold Th2 (the arrival time threshold TTC2) and the second braking quantity DEC2 so that the braking after the second threshold Th2 becomes appropriate.

Effect of this embodiment is based on the external disturbance determining means determining an external disturbance that influences braking applied on host vehicle MM. When the level of suppression for suppressing braking applied on the host vehicle MM is high due to the external disturbance determined by the external disturbance determining means, the first correction means compares this with the case when the suppression level is lower, and has at least one of the first threshold and second threshold corrected to a smaller value of the risk potential, when the external disturbance hampers braking, assistance can be carried out at a quicker timing, and, when the external disturbance augments braking, assist can be carried out at a slower timing. As a result, it is possible to carry out assistance of driving at an appropriate timing corresponding to the external disturbance.

Additionally, the external disturbance determining means determines an external disturbance based on the driving force. As a result, even when no braking force is applied on the host vehicle MM, it is still possible to determine an external disturbance. That is, the braking force application means can determine an external disturbance before a braking force is applied on the host vehicle MM based on the braking force instruction value computed with at least one of the first braking force instruction value computing means and the second braking force instruction value computing means.

In the first through fourth embodiments the case has been explained in which a braking force is applied based on the risk potential of the host vehicle MM with respect to an obstacle XM ahead of the host vehicle MM. However, the present invention is not limited to the scheme. One may also adopt a scheme in which a braking force is applied based on the risk potential of the host vehicle MM with respect to an obstacle XM behind the host vehicle MM when the host vehicle MM backs up. That is, the obstacle XM in the travelling direction of the host vehicle MM is detected, and a braking force is applied based on the risk potential of the host vehicle MM with respect to detected the obstacle XM.

While the invention has been disclosed with reference to certain preferred embodiments, numerous modifications, alterations, and changes to the described embodiments are possible without departing from the sphere and scope of the invention, as defined in the appended claims and their equivalents thereof. Accordingly, it is intended that the invention not be limited to the described embodiments, but that it have the full scope defined by the language of the following claims.

What is claimed is:

1. A vehicle braking assist device for a host vehicle comprising:
   a risk potential computing device that computes a risk potential of the host vehicle with respect to an obstacle in the travelling direction of the host vehicle
   based on a computed arrival time or distance to the obstacle;
   a sensor that detects an operation state of an accelerator;
   a braking force application device; and
   a controller that controls the braking force assist device to:
   (1) apply a breaking force when the risk potential exceeds a first threshold, but not a second threshold, unless the operation state of the accelerator exceeds a prescribed value, thus overriding the braking assist device; and
   (2) apply a breaking force irrespective of the operation state of the accelerator when the risk potential exceeds the second threshold that is greater than the first threshold.

2. The vehicle braking assist device of claim 1, further comprising:
   an external disturbance determining part that determines an external disturbance that influences braking applied on the host vehicle; and
   a braking force instruction value computing part that corrects the braking applied on the host vehicle by increasing at least one of the first braking force and the second braking force applied by the braking force application device when a level of suppression of braking applied on the host vehicle increases due to the external disturbance.

3. The vehicle braking assist device of claim 1, further comprising:
   an accelerator reactive force application device that applies an accelerator reactive force when the risk potential is higher than a predetermined third threshold.

4. The vehicle braking assist device of claim 3 wherein the risk potential represented by the third threshold is lower than the risk potential represented by the first threshold.

5. The vehicle braking assist device of claim 3, further comprising:
   an external disturbance determining part that determines an external disturbance that influences braking applied on the host vehicle; and
   a braking force instruction value computing part that corrects the braking applied on the host vehicle by decreasing the third threshold when a level of suppression of braking applied on the host vehicle increases due to the external disturbance.

6. The vehicle braking assist device of claim 3, further comprising:
   an external disturbance determining part that determines an external disturbance that influences braking applied on the host vehicle; and
   a braking force instruction value computing part that corrects the braking applied on the host vehicle by increasing the accelerator reactive force applied by the accelerator reactive force applying device when a level of suppression of braking applied on the host vehicle increases due to the external disturbance.

7. The vehicle braking assist device of claims 1, wherein the risk potential computing device computes a proximity of the host vehicle to the obstacle as a value representing the risk potential, and the braking force application device determines whether the risk potential is higher than one or both of the first threshold and the second threshold based on the computed proximity.

8. The vehicle braking assist device of claim 7, wherein the risk potential computing part computes the proximity based on the relative distance between the host vehicle and the obstacle, using information comprising at least one of: a relative speed of the host vehicle with respect to the obstacle, and a relative acceleration/deceleration of the host vehicle with respect to the obstacle.

9. The vehicle braking assist device of claim 7, wherein the risk potential computing part computes the expected arrival time determined for the host vehicle to reach the position of the obstacle as the proximity using information comprising at least one of: a relative speed of the host vehicle with respect to the obstacle, and a relative acceleration/deceleration of the host vehicle with respect to the obstacle.

10. The vehicle braking assist device of claim 7, further comprising:
    picture taking means that takes pictures in the travelling direction of the host vehicle;
    wherein the risk potential computing part computes the proximity based on images of the obstacle in the pictures taken by the picture taking means.

11. The vehicle braking assist device of claim 1, further comprising:
    an external disturbance determining part that determines an external disturbance that influences braking applied on the host vehicle; and
    a braking force instruction value computing part that corrects the braking applied on the host vehicle by decreasing at least one of the first threshold and the second threshold when a level of suppression of braking applied on the host vehicle increases due to the external disturbance.

12. The vehicle braking assist device of claim 11, wherein the external disturbance determined by the external disturbance determining part is an external disturbance caused by at least one of a braking torque transmission rate when a braking force is applied on the vehicle, a road surface frictional coefficient, and a vehicle weight of the host vehicle.

13. The vehicle braking assist device of claim 11, wherein the external disturbance determined by the external disturbance determining part is an external disturbance caused by at least one of a road slope and an air drag.

14. The vehicle braking assist device of claim 11, wherein:
    the external disturbance determining part determines an external disturbance when the first braking force is applied by the braking force application device; and
    the braking force instruction value computing part corrects at least one of the second threshold and the first braking force applied by the braking force application device based on the external disturbance.

15. The vehicle braking assist device of claim 14, further comprising:
    a wheel velocity sensor that detects a wheel velocity of the host vehicle; and
    an acceleration/deceleration computing part that computes the acceleration/deceleration of the host vehicle based on the wheel velocity of the host vehicle;

wherein the external disturbance determining part determines the external disturbance based on the acceleration/deceleration of the host vehicle and the first braking force applied by the braking force application device.

16. A method of assisting vehicle braking of a host vehicle comprising:
   detecting a risk potential of the host vehicle with respect to an obstacle in a travelling direction of the host vehicle based on a computed arrival time or distance to the obstacle;
   detecting an operating state of an accelerator of the host vehicle; and
   (1) applying a breaking force when the risk potential exceeds a first threshold, but not a second threshold, unless the operation state of the accelerator exceeds a prescribed value, thus overriding a breaking assist device; and
   (2) applying a breaking force irrespective of the operation state of the accelerator when the risk potential exceeds the second threshold that is greater than the first threshold.

17. A vehicle braking assist device for a host vehicle comprising:
   risk potential computing means that computes a risk potential of the host vehicle with respect to an obstacle in the travelling direction of the host vehicle
   based on a computed arrival time or distance to the obstacle;
   accelerator detecting means that detects an operation state of an accelerator;
   braking force application means; and
   a controller that controls the braking force assist device to:
   (1) apply a breaking force when the risk potential exceeds a first threshold, but not a second threshold, unless the operation state of the accelerator exceeds a prescribed value, thus overriding the breaking assist device; and
   (2) apply a breaking force irrespective of the operation state of the accelerator when the risk potential exceeds the second threshold that is greater than the first threshold.

* * * * *